US008561049B2

(12) United States Patent
Peleg et al.

(10) Patent No.: US 8,561,049 B2
(45) Date of Patent: Oct. 15, 2013

(54) METHOD AND SYSTEM FOR UPDATING CONTENT STORED IN A STORAGE DEVICE

(75) Inventors: Sharon Peleg, Ramat Hasharon (IL); Evyatar Meller, Petach-Tikva (IL)

(73) Assignee: Red Bend Ltd., Hod Hasharon (IL)

( * ) Notice: Subject to any disclaimer, the term of this patent is extended or adjusted under 35 U.S.C. 154(b) by 1521 days.

(21) Appl. No.: 11/508,337

(22) Filed: Aug. 23, 2006

(65) Prior Publication Data
US 2007/0050430 A1 Mar. 1, 2007

Related U.S. Application Data

(60) Provisional application No. 60/710,191, filed on Aug. 23, 2005.

(51) Int. Cl.
*G06F 9/44* (2006.01)

(52) U.S. Cl.
USPC .............................. 717/168; 717/171; 717/172

(58) Field of Classification Search
None
See application file for complete search history.

(56) References Cited

U.S. PATENT DOCUMENTS

| | | | | |
|---|---|---|---|---|
| 4,654,819 A | * | 3/1987 | Stiffler et al. | 711/162 |
| 5,414,839 A | * | 5/1995 | Joshi | 1/1 |
| 5,432,922 A | * | 7/1995 | Polyzois et al. | 714/6 |
| 5,717,929 A | * | 2/1998 | Furukawa et al. | 717/168 |
| 5,748,967 A | * | 5/1998 | Nakamura et al. | 717/168 |
| 5,806,078 A | * | 9/1998 | Hug et al. | 715/205 |
| 5,832,520 A | * | 11/1998 | Miller | 1/1 |
| 5,845,313 A | * | 12/1998 | Estakhri et al. | 711/103 |
| 5,943,675 A | * | 8/1999 | Keith et al. | 1/1 |
| 6,018,747 A | | 1/2000 | Burns et al. | |
| 6,233,730 B1 | * | 5/2001 | Todd et al. | 717/171 |
| 6,374,250 B2 | * | 4/2002 | Ajtai et al. | 1/1 |
| 6,425,125 B1 | * | 7/2002 | Fries et al. | 717/168 |
| 6,542,906 B2 | * | 4/2003 | Korn | 707/641 |

(Continued)

FOREIGN PATENT DOCUMENTS

| | | |
|---|---|---|
| EP | 1 510 924 A1 | 3/2005 |
| WO | WO 2004/031961 A1 | 4/2004 |
| WO | WO 2004/114130 A2 | 12/2004 |
| WO | WO 2005/003963 A2 | 1/2005 |

OTHER PUBLICATIONS

Eran Gal et al., "Mapping Structures for Flash Memories:Techniques and Open Problems", IEEE, 2005, <Mapping Structures for Flash Memories: Techniques and Open Problems>, pp. 1-10.*

(Continued)

*Primary Examiner* — Thuy Dao
*Assistant Examiner* — Samuel Hayim
(74) *Attorney, Agent, or Firm* — Buchanan Ingersoll & Rooney PC

(57) ABSTRACT

Method and system for in-place updating original content of an original version stored in a non-volatile storage device and for yielding updated content of an updated version. At least part of content of each one of n (n>1) blocks of the original version is modified in the updated version. The non-volatile storage device includes blocks. The method includes obtaining an update package. It also includes performing m block storage operations, wherein each block storage operation includes writing content to a block in the non-volatile storage device. The block storage operations include update block storage operations storing updated content of the updated version in the non-volatile storage device, while the updated content is generated in accordance with at least the update package, wherein $2<=m<2n$.

11 Claims, 13 Drawing Sheets

(56) References Cited

U.S. PATENT DOCUMENTS

| | | | |
|---|---|---|---|
| 6,546,552 B1 | 4/2003 | Peleg | |
| 6,640,334 B1* | 10/2003 | Rasmussen | 717/171 |
| 6,671,757 B1* | 12/2003 | Multer et al. | 710/100 |
| 6,775,423 B2* | 8/2004 | Kulkarni et al. | 382/305 |
| 6,832,373 B2 | 12/2004 | O'Neill | |
| 6,915,513 B2* | 7/2005 | Duesterwald et al. | 717/168 |
| 6,925,467 B2* | 8/2005 | Gu et al. | 1/1 |
| 6,938,109 B1* | 8/2005 | Sliger et al. | 710/68 |
| 6,970,969 B2* | 11/2005 | Wong et al. | 711/103 |
| 7,007,049 B2* | 2/2006 | Peng | 1/1 |
| 7,779,055 B2* | 8/2010 | Peng | 707/819 |
| 7,802,129 B2* | 9/2010 | Slyz et al. | 714/5.1 |
| 2002/0073411 A1* | 6/2002 | Tsunedomi et al. | 717/171 |
| 2003/0084434 A1* | 5/2003 | Ren | 717/172 |
| 2003/0154471 A1* | 8/2003 | Teachman et al. | 717/171 |
| 2004/0031030 A1* | 2/2004 | Kidder et al. | 717/172 |
| 2004/0062130 A1 | 4/2004 | Chiang | |
| 2004/0088473 A1* | 5/2004 | Ogle | 711/100 |
| 2004/0187104 A1* | 9/2004 | Sardesai et al. | 717/168 |
| 2005/0149922 A1* | 7/2005 | Vincent | 717/172 |
| 2005/0183081 A1* | 8/2005 | Burdy et al. | 717/174 |
| 2005/0188368 A1* | 8/2005 | Kinney | 717/174 |
| 2005/0216530 A1* | 9/2005 | Meller et al. | 707/203 |
| 2005/0229032 A1* | 10/2005 | Kusama et al. | 714/6 |
| 2006/0004756 A1* | 1/2006 | Peleg et al. | 707/8 |
| 2006/0080650 A1* | 4/2006 | Winters et al. | 717/168 |
| 2007/0150524 A1* | 6/2007 | Eker et al. | 707/203 |
| 2007/0192532 A1* | 8/2007 | Ogle | 711/103 |
| 2007/0226328 A1* | 9/2007 | Kusama et al. | 709/223 |

OTHER PUBLICATIONS

Cahndrasekhar Boyapati et al., "Lazy Modular Upgrades in Persistent Object Stores", ACM, 2003, <http://delivery.acm.org/10.1145/950000/949341/p403-boyapati.pdf>, pp. 1-15.*

"Mainframe Software Upgrade: Evolution, Not Revolution" Aberdeen Group, Feb. 2001, <http://sirius-software.com/articles/mfevolve.html>, pp. 1-6.*

* cited by examiner

METHOD AND SYSTEM FOR UPDATING CONTENT STORED IN A STORAGE DEVICE

FIELD OF THE INVENTION

This invention relates to a method and system for in-place updating content stored in a storage device. More specifically this method relates to in-place updating an original version of content to an updated version in a non volatile storage device that includes blocks.

BACKGROUND OF THE INVENTION

It is sometimes required to update content stored in a storage device. For example, if the content is software, or a program (such as an executable file), it is sometimes required to fix a bug existing therein or introduce new features thereto. The latter example is non-limiting and other types of content may also require updates, such as text, data stored in a database, etc. Hereinafter the terms "old version" or "original version" refer to a version of content before update, and the terms "new version" or "updated version" refer to a version that includes already updated content. In other words, an original version includes "original content" while an updated version includes "updated content". It should be noted that updated content can be further updated. In case of a second update, for example, the updated content of the first update turns to be original content of the second update while new updated content is generated by the second update, etc.

A process that updates original content yielding updated content is referred to as an "update process". The update process usually requires instructions, instructing it how to perform the update. Such instructions provided for the update process constitute, together, an "update package", wherein each instruction included therein constitutes an "update command". That is, an update process obtains an update package as input, and operates in accordance therewith in order to update the original content to updated content. This is non-limiting though and sometimes an update process can obtain more than one update package allowing them, together, to update the content. Alternatively, instead of obtaining an update package, the update process can sometimes retrieve an update package (or a set of update commands) from a storage device or from a database, etc. Hence, hereinafter, when referring to the term "obtaining an update package" it should be appreciated that the update process can passively obtain the package, it can actively retrieve the package or sometimes it can activate a package embedded therein (e.g., a hard coded set of update commands).

One way to update an original version to an updated version is storing the updated version in the storage device in addition to the original version. For example, a computer program "prog.exe" is activated whenever a user presses a certain icon on the PC (Personal Computer) windows desktop. In order to update prog.exe it is possible to store the updated version of this file in a different location than the present (original) version, and then reset the path associated with the icon so as to activate the updated version instead of the original version. Later, when it is ascertained that the update process completed successfully, the original version can be deleted safely, releasing the space occupied thereby. This latter update method requires that the complete updated version be provided to the update process, e.g., in the update package. Such an update package can easily be huge in size, and if it is required to transmit it to the updated device via band-width limited communication channels, transmittance may become cumbersome and sometimes even impossible. Therefore, it is preferable that the size of the update package be reduced.

Another update method can simply overwrite original content with updated content. This update method is risky and unreliable, because if the update process fails in the middle of updating, when part of the original version is already overwritten, while only part of the updated version is written to the storage device, it should be appreciated that the version stored on the storage device at the time of interruption is probably invalid or inoperable. In addition, the requirement to transmit the complete updated version is not yet solved with this method. Yet, it is noted that updating content by overwriting the original content with the updated content is commonly referred to in the art as "in-place update". Hereinafter, unless specifically noted, the term "update" is used to describe "in-place update".

One way for reducing the size of an update package is by including in it information representing the differences between the original and updated content. Such an update package is sometimes referred to also as a "difference", a "difference result" or a "delta". The update process, upon operating in accordance with a delta, applies it to the original content, thereby producing the updated content.

The size of the delta being considered, there are methods trying to reduce the size thereof. For example, U.S. Pat. No. 6,546,552 ("Difference extraction between two versions of data-tables containing intra-references", published 2003) discloses a method for generating a compact difference result between an old program and a new program. Each program includes reference entries that contain references that refer to other entries in the program. According to the method of U.S. Pat. No. 6,546,552, the old program is scanned and for each reference entry, the reference is replaced by a distinct label mark, whereby a modified old program is generated. In addition, according to U.S. Pat. No. 6,546,552, the new program is scanned and for each reference entry the reference is replaced by a distinct label mark, whereby a modified new program is generated. Thus, utilizing directly or indirectly the modified old program and modified new program, the difference result is generated.

WO 2004/114130 ("Method and system for updating versions of content stored in a storage device", published 2004) discloses a system and method for generating a compact update package between an old version of content and a new version of content. The system of WO 2004/114130 includes a conversion element generator for generating a conversion element associated with the old version and new version. It also includes a modified version generator for generating a modified version, and an update package generator for generating the compact update package. The compact update package includes the conversion element and a modified delta based on the modified version and the new version.

WO 2005/003963 ("Method and system for updating versions of content stored in a storage device", published 2005) discloses a system and method for updating versions of content stored in a storage device. The system of WO 2005/003963 includes an update module for obtaining a conversion element and a small delta. It also includes a converted old items generator for generating converted old items by applying the conversion element to items of an old version, a data entries generator for generating data entries based on the modified data entries and on the converted old item, and a new version generator for generating a new version of content by applying the commands and the data entries to the old version.

It was noted before that an update package is sometimes referred to as a delta, however, this is non-limiting, and as it appears from WO 2004/114130 and WO 2005/003963, the update package sometimes includes a delta therewith.

Other methods exist in the art, but before they are mentioned, several considerations should be discussed. For example, it is appreciated that content is normally stored in a storage device. A storage device can be a volatile storage device (such as Random Access Memory, RAM) or a non-volatile storage device (such as a hard disk or flash memory).

There are storage devices that are organized in discrete areas, referred to, e.g., as blocks or sectors, wherein one block can include content belonging to more than one file. Hence, if there are, for example, two files stored in a storage device, a single block can include several ('x') bytes belonging to a first of the two files, as well as several ('y') bytes belonging to a second of the two files. If the size of a block is 'z' bytes, it is clear that $z>=x+y$. Yet, those versed in the art would appreciate that writing content into a block affects other content stored therein. That is, if it is required to re-write the content stored in the x bytes of the first file (e.g., during update thereof), due to storage device limitations it may be impossible to write only those x bytes, and it may be necessary to write the content of all the z bytes to the storage device. This can be done, for example, by reading content stored in the z bytes from the non-volatile storage device to a volatile storage device not including blocks, such as RAM, updating only the content stored in the x bytes in the volatile storage device (that is, the content of the other z-x bytes is left unaffected therein) and then writing the content of the z bytes back to the non-volatile storage device. This limitation characterizes flash memory devices, for example, wherein it is required to completely delete the present content of a block, before new content (including updated content) can be written thereto, and hard disks where it is not obligatory to delete the complete sector before writing data thereto, but it is required to write the complete content of a block in one writing operation (e.g., it is impossible to write only x bytes when leaving the content stored in the z-x bytes unaffected; In order to leave the z-x bytes unaffected, it is required to store the content thereof in the volatile memory device and write them back into the block, together with the x bytes). Hence, the update procedure may require many write operations to the storage device including blocks, and it is appreciated that in order to achieve an efficient update, the update should better be optimized. For example, if x equals, for example, two bytes, than these two bytes should better be updated together, instead of updating the first byte and then the second byte, writing these two bytes separately into the block.

Furthermore, when updating an original version (including original content) to an updated version (including updated content), there are sometimes update commands that use original content in order to generate updated content. For example, it is possible to copy original content to a different place in the storage device, wherein this copied content, in its destination place, forms part of the updated version. When copying content to a destination place it should be appreciated that this destination place could have been used before for storing other content (possibly also being part of the original version). Hence, the copied content can overwrite other original content. Still further, it is possible that there is another update command that uses the other original content in order to generate updated content. If this other update command is called further to operating in accordance with the first update command, the other original content can be already overwritten. This situation constitutes a "write before read conflict".

Write before read conflicts are a known problem in the art and U.S. Pat. No. 6,018,747 tries to cope therewith.

U.S. Pat. No. 6,018,747 ("Method for generating and reconstructing in-place delta files", published 2000) discloses a method, apparatus, and article of manufacture for generating, transmitting, replicating, and rebuilding in-place reconstructible software updates to a file from a source computer to a target computer. U.S. Pat. No. 6,018,747 stores the first version of the file and the updates to the first version of the file in the memory of the source computer. The first version is also stored in the memory of the target computer. The updates are then transmitted from the memory of the source computer to the memory of the target computer. These updates are used at the target computer to build the second version of the file in-place.

According to U.S. Pat. No. 6,018,747, when a delta file attempts to read from a memory offset that has already been written, this will result in an incorrect reconstruction since the prior version data has been overwritten. This is termed a write before read conflict. U.S. Pat. No. 6,018,747 teaches how to post-process a delta file in order to create a delta file, minimize the number of write before read conflicts, and then replace copy commands with add commands to eliminate conflicts. A digraph is generated, for representing the write before read conflicts between copy commands. A schedule is generated that eliminates write before read conflicts by converting this digraph into an acyclic digraph. Yet, U.S. Pat. No. 6,018,747 uses the delta file in order to backup, or protect, content overwritten during write before read conflicts. Hence, the delta file is enlarged.

Another known problem in the art occurs when a process of updating an old version is interrupted before its normal termination, such as in a power failure. In such a case, there is a possibility that the content of the block which was updated during the interruption may become corrupted and contain unexpected content.

It was already mentioned before that when updating blocks of content, an original content of a block sometimes forms part of the input used by the update process. In such a case, if the original block (which is corrupted due to interruption) is required, the update process may be unable to resume. It can be impossible to re-update the corrupted block.

U.S. Pat. No. 6,832,373 ("System and method for updating and distributing information", published 2004), for example, tries coping with the problem. It discloses devices, systems and methods for updating digital information sequences that are comprised by software, devices, and data. In addition, these digital information sequences may be stored and used in various forms, including, but not limited to files, memory locations, and/or embedded storage locations. Furthermore, the devices, systems, and methods described in U.S. Pat. No. 6,832,373 provide a developer skilled in the art with an ability to generate update information as needed and, additionally, allow users to proceed through a simplified update path, which is not error-prone, and according to U.S. Pat. No. 6,832,373's inventors, may be performed more quickly than through the use of technologies existing when U.S. Pat. No. 6,832,373 was filed.

That is, U.S. Pat. No. 6,832,373 describes using an auxiliary backup block, while all block update operations are performed thereby using two phases 'two-phase protocol' or 'two-phase commit'. According to U.S. Pat. No. 6,832,373, in a first phase of updating a block, the update process writes the updated content to the auxiliary backup block and verifies that the content is correctly stored. In a second phase, the update process writes the updated content into its target block to form the updated content of the updated block. Variations of the same method exist, such as copying the original content of the updated block into the auxiliary backup block in the first phase, and in the second phase updating the target block to store the updated content.

The two phase commit (whether the backed up content is the original content or the updated content) is time consuming, since every write operation requires performing two operations (for the two phases). In addition, according to U.S. Pat. No. 6,832,373 every backup operation backups the complete (original or updated) content of a block in the auxiliary backup block, and hence if the number of blocks updated by the update process is n, the total number of operations required for the update process (including update operations and write operations into the auxiliary backup block) can not be smaller than 2n. If there are blocks into which content is written in more than one write operation, the number of operations that the update process is required to perform will be even larger than 2n.

There is a need in the art, thus, for a reliable and efficient mechanism for in-place updating original content of an original version, generating an updated version.

SUMMARY OF THE DISCLOSURE

The present disclosure illustrates a method for in-place updating original content of an original version stored in a non-volatile storage device, to yield updated content of an updated version, wherein at least part of content of each one of n (n>1) blocks of the original version are modified in the updated version, the non-volatile storage device including blocks, the method comprising:

obtaining an update package; and performing m block storage operations, wherein each block storage operation includes writing content to a block in the non-volatile storage device;

the block storage operations include update block storage operations storing updated content of the updated version in the non-volatile storage device, the updated content is generated in accordance with at least the update package;

wherein $2<=m<2n$.

The present disclosure further illustrates a method for in-place updating original content of an original version stored in a non-volatile storage device, to yield updated content of an updated version, the non-volatile storage device including blocks, the method comprising:

obtaining an update package; and performing block storage operations, wherein each block storage operation includes writing content to a block in the non-volatile storage device;

the block storage operations include at least one backup block storage operation, wherein each backup block storage operation includes storing protected content stored in one or more segments of one or more blocks of the non-volatile storage device in a non-volatile protection buffer;

the block storage operations also include update block storage operations storing updated content of the updated version in the non-volatile storage device, the updated content is generated in accordance with at least the update package;

wherein the in-place updating includes less backup block storage operations than update block storage operations.

The present disclosure further illustrates a method for updating original content of an original version stored in a storage device to yield updated content of an updated version, in accordance with an update package, the method comprising:

obtaining an update-package including transforming update commands;

protecting original content of segments in a non-volatile protection buffer, the segments are source segments of transforming update commands; and updating the original version of content to the updated version of content in accordance with the update package, while restoring protected content being source of the transforming update commands from the non-volatile protection-buffer.

The present disclosure still further illustrates a method for in-place updating original content of an original version stored in a non-volatile storage device, to yield updated content of an updated version, the non-volatile storage device including blocks and the original version occupies more than one block, the method comprising:

obtaining an update package;

protecting original content of the original version in a non-volatile backup buffer, the non-volatile backup buffer including at least one block, wherein at least one block of the non-volatile backup buffer is used for protecting original content originated from more than one block in the original version; and updating the original version to yield the updated version, utilizing directly or indirectly at least the update package and protected original content stored in the non-volatile backup buffer.

Still further, the present disclosure illustrates a program storage device readable by machine, tangibly embodying a program of instructions executable by the machine to perform a method for in-place updating original content of an original version stored in a non-volatile storage device, to yield updated content of an updated version, wherein at least part of content of each one of n (n>1) blocks of the original version are modified in the updated version, the non-volatile storage device including blocks, the method comprising:

obtaining an update package; and performing m block storage operations, wherein each block storage operation includes writing content to a block in the non-volatile storage device;

the block storage operations include update block storage operations storing updated content of the updated version in the non-volatile storage device, the updated content is generated in accordance with at least the update package;

wherein $2<=m<2n$.

Yet still further, the present disclosure illustrates a computer program product comprising a computer useable medium having computer readable program code embodied therein for in-place updating original content of an original version stored in a non-volatile storage device, to yield updated content of an updated version, wherein at least part of content of each one of n (n>1) blocks of the original version are modified in the updated version, the non-volatile storage device including blocks, the computer program product comprising:

computer readable program code for causing the computer to obtain an update package; and computer readable program code for causing the computer to perform m block storage operations, wherein each block storage operation includes writing content to a block in the non-volatile storage device;

the block storage operations include update block storage operations storing updated content of the updated version in the non-volatile storage device, the updated content is generated in accordance with at least the update package;

wherein $2<=m<2n$.

Still further, the present disclosure illustrates a program storage device readable by machine, tangibly embodying a program of instructions executable by the machine to perform a method for in-place updating original content of an original version stored in a non-volatile storage device, to yield updated content of an updated version, the non-volatile storage device including blocks, the method comprising:

obtaining an update package; and performing block storage operations, wherein each block storage operation includes writing content to a block in the non-volatile storage device;

the block storage operations include at least one backup block storage operation, wherein each backup block storage operation includes storing protected content stored in one or more segments of one or more blocks of the non-volatile storage device in a non-volatile protection buffer;

the block storage operations also include update block storage operations storing updated content of the updated version in the non-volatile storage device, the updated content is generated in accordance with at least the update package;

wherein the in-place updating includes less backup block storage operations than update block storage operations.

The present disclosure still further illustrates a computer program product comprising a computer useable medium having computer readable program code embodied therein for in-place updating original content of an original version stored in a non-volatile storage device, to yield updated content of an updated version, the non-volatile storage device including blocks, the computer program product comprising:

computer readable program code for causing the computer to obtain an update package; and computer readable program code for causing the computer to perform block storage operations, wherein each block storage operation includes writing content to a block in the non-volatile storage device;

the block storage operations include at least one backup block storage operation, wherein each backup block storage operation includes storing protected content stored in one or more segments of one or more blocks of the non-volatile storage device in a non-volatile protection buffer;

the block storage operations also include update block storage operations storing updated content of the updated version in the non-volatile storage device, the updated content is generated in accordance with at least the update package;

wherein the in-place updating includes less backup block storage operations than update block storage operations.

It is noted that according to certain embodiments the invention includes an apparatus for generating an update package, wherein the update package is configured to optimize an update sequence. The optimization, according to certain embodiments, will achieve a protected content size which is smaller than any other protected content size achieved by other update sequence sequences. According to other embodiments the protected content size is smaller than the average protected content size achieved by other possible update sequences. According to yet other embodiments, the protected content size is smaller than an arbitrary size of a protected content that depends on an arbitrary update sequence associated with the update package. In addition, other variants are also applicable.

In accordance with certain other aspects of the invention there are provided devices (apparatuses) for carrying out the specified methods.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EMBODIMENTS

Figure 1:
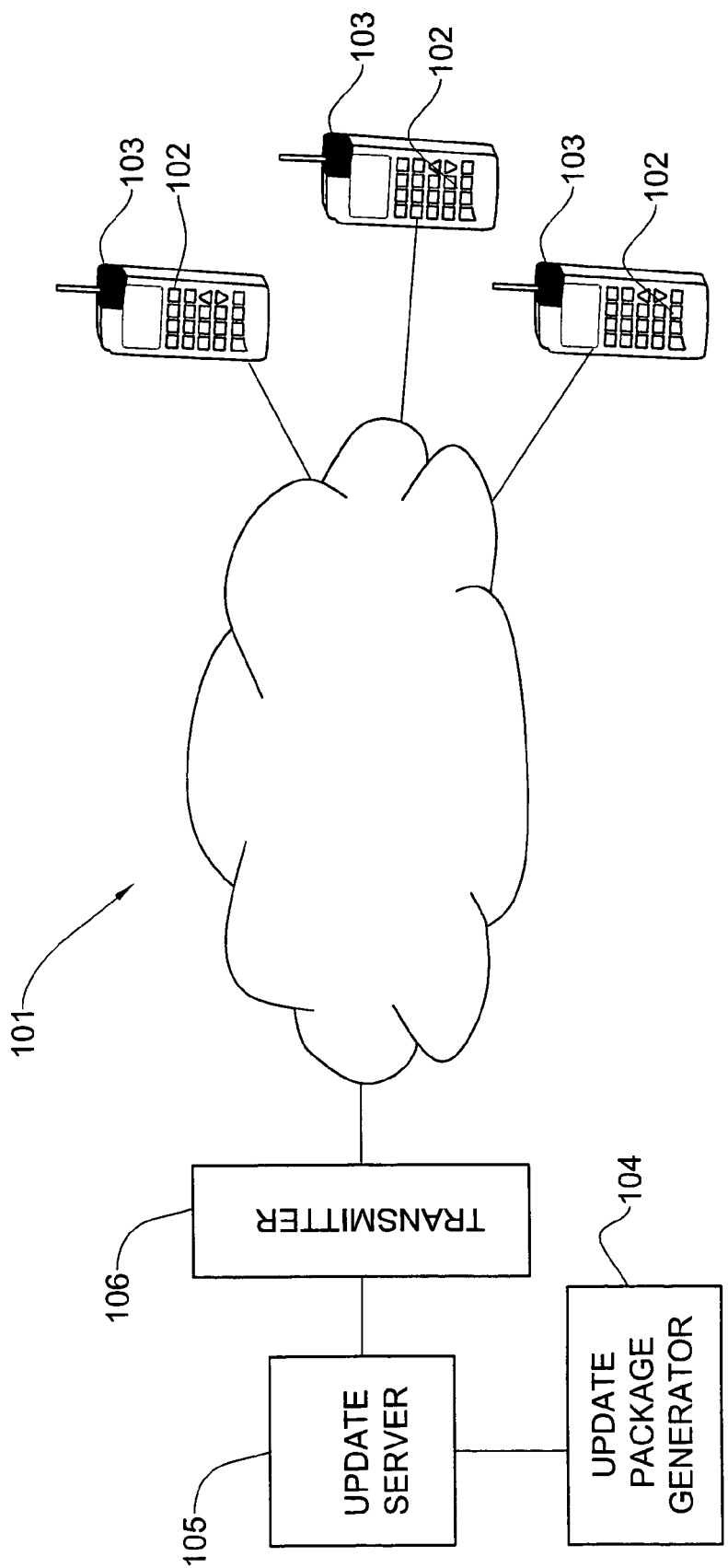
FIG. 1 is a schematic illustration of a system for updating versions in a cellular network, in accordance with one embodiment of the invention.

In the following description components that are common to more than one figure will be referenced by the same reference numerals.

Furthermore, unless specifically noted, the term "update" is used hereinafter to refer to "in-place update".

FIG. 1 is a schematic illustration of a system 101 for updating versions in a cellular network, in accordance with one embodiment of the invention. Cellular telephones 102 that are coupled to or include storage devices 103, execute programs that enable their operation. Programs are normally stored in files. The version of the program currently executing on a cellular telephone is referred to, hereinafter, as an "old version" or as an "original version".

It is noted that memory devices, such as the storage devices 103, are sometimes referred to also as "memory devices" or "memory units".

Sometimes there is a need to update the programs in order for a telephone 102, for example, to execute a newer version thereof, constituting an "updated version" or a "new version". Such an updated version is generated by an update process operating in the telephone. The update process operates in accordance with an update package (constituting a "delta file") that the telephone receives.

According to the invention, an update package is generated in an update package generator 104, operating, for example, in a personal computer (PC) or in any other type of computer. The update package is stored in an update server 105 and transmitted, via a transmitter 106 to the cellular telephones 102.

It should be noted that the system 101 illustrated in FIG. 1 is a non-limiting example and the invention is not limited to updating programs. Many other types of content stored in storage devices require update, such as data stored in databases, files stored in the storage device etc. Therefore, hereinafter the term "content" will be used instead of "program".

In the same way, the invention is not limited to cellular networks and/or to cellular telephones 102. It should be appreciated that cellular telephones belong to a group referred to as embedded devices. There are other embedded devices, such as Personal Digital Assistants (PDAs), set-top boxes and other consumer electronic devices that are coupled to storage devices for storing content, and sometimes it is required to update the content stored therein. Yet, it is possible to update also content stored in storage devices coupled to non-embedded devices, such as PCs or other computers. Therefore, the storage devices 103 can be, for example, harddisk drives, Flash-memory devices, EPROMs (Erasable Programmable Read-Only Memory) and EEPROMs (Electrically EPROM) or any other storage device.

For example, a PC, or any other computer, can store files that include data required for its operation or for operation of programs executing therein (such as "info files" or "dot files" known for those versed in the art). Sometimes it is required to update this data, for example, via communication lines, e.g., via the Internet or via any other communication means.

Understanding this, instead of using terms such as "telephones", "PDAs" "consumer electronic devices", "computers", "PCs", etc., the term "updated devices" will be used hereinafter, and it should be noted that the term "updated device" can refer to any device that is coupled to a storage device and allows updating content stored therein.

It was previously explained that in order to update content stored in the storage devices, update packages are generated, stored in the update server 105 and conveyed to the updated devices (such as the cellular telephones 102) and the storage devices coupled therewith. Alternatively, it is possible to convey an update package without storing it first in an update server 105. For example, it is possible to convey the update package directly from the update package generator where it is generated. In such a case the machine where the update generator operates, or the update generator itself is considered as the update server 105.

Furthermore, in the example illustrated in FIG. 1 the update package is conveyed via the transmitter 106. This is also non-limiting and any other way applicable for conveying the update package can be used. For example, it is possible to store the update package on a portable storage device, such as a floppy disk or disk-on-key thus allowing an updated device (such as the telephones 102) to access the update package by reading it therefrom.

When an updated device receives an update package, it can operate an update process in accordance with the update package, wherein the update process updates the original version for generating an updated version. It should be noted that the updated device can operate the update process immediately after receiving the update package. Alternatively it can store the update package in a non-volatile memory, such as in the storage device 103, and operate the update process at some later time (such as the next time the updated device reboots).

It is noted that a storage device can store content of more than one original and/or updated version. For example, it is appreciated that there can be several computer programs installed in a single hard disk.

In many cases a file is constituted of logically sequential content. For example, in a file including text, wherein the text is "123456789", the character '2' is logically consecutive to the character '1', the character '3' is logically consecutive to the character '2', etc. However, those versed in the art would appreciate that when storing this file in a storage device, the stored file, or the content included therein can be fragmented, i.e., different portions of the file can be stored in different portions, or blocks, of the storage device. In other words, a logically sequential content is not necessarily stored in a physically sequential manner in the storage device.

Bearing in mind that a logically sequential content is not necessarily stored in a physically sequential manner in the storage device and/or that the size of the logically sequential content can be larger than the size of a block, it should be appreciated that logically sequential content can be spread over several storage blocks. Furthermore, one storage block can include content belonging to several logically sequential contents (such as several files). Returning now to the previous example, where the text "123456789" constitutes logically sequential content, it should be appreciated that the content "1234" can be stored in one physical block, while the content "56789" in this example can be stored in a different physical block that physically precedes the block where "1234" is stored (yet it is clear that logically the content "1234" precedes the content "56789").

The logically sequential text "123456789" will be further considered as an original version. According to the example, it is possible to update this file to include an updated version, wherein the text stored in the updated version is "123756489". In this updated version the characters '4' and '7' were switched, compared to their position in the original version. In other words, the character '7' in the updated version replaces the character '4' that appears in the original version, while the character '4' replaces the character '7'. It should thus be appreciated that in order to generate this updated version, it is possible, e.g., to divide the original version into several segments (each segment constitutes a "logical block"). The first segment includes the content "123", the second segment's content is "4", the third segment includes "56", the fourth includes "7" and the fifth includes "89". When generating the updated version, the first, third and fifth segments are left intact, while the content of the second and fourth segments are switched. Thus, a segment includes logically sequential content.

The previous example of the "123456789" text and the update thereof to the updated version "123756489" is a simplified example. In other examples it is possible, to divide the content into segments that occupy physically sequential area in one or more physical blocks. Thus, if "123" is fragmented in a way where "12" is stored in a first block, while "3" is stored in a second block, wherein "12" does not sequentially precede "3", then according to this example "123", although logically sequential, should be divided into two segments (specifically these are "12" and "3").

In this latter example the segment "12" can yet reside on two different blocks, as long as the blocks are sequential (a first block sequentially preceding a second block) and as long as the character '1' is stored in an area ending the first block while the character '2' is stored in the area opening the second block.

This latter example is non-limiting. For example, an alternative embodiment can limit a segment to occupy physically sequential area in one physical block (unlike "one or more" in the previous example). Thus, if "12" is sequentially stored in two sequential blocks it must be further divided into two segments (one is "1" and the second is "2").

In addition, moving a segment or leaving it intact are not the only behaviors, or transformations, that are allowed. For example, it is possible to delete a segment or to perform a calculation on the content stored therein. Thus, instead of switching the "4" and "7" segments in the "123456789" example, it is possible to add 3 to the numerical value corresponding to the content of the "4" segment (4 plus 3 yield 7) Similarly, it is possible to subtract 3 from the numerical value corresponding to the content of the "7" segment (7 minus 3 yield 4). In accordance with this case, "4" and "7" are still considered segments in the original version.

When content of a segment in the updated version (an "updated segment") corresponds to content of a segment in the original version (an "original segment"), these segments are considered as "corresponding segments" or "matched segments". Correspondence refers to any logical or arithmetic connection between the segments, wherein the updated segment can be a copy of the original segment, it can be a modified copy of the original segment (e.g., it is sometimes preferred to copy the content of a segment and then modify part or all of the copied content), it can include content received by computing the content of the updated segment based on content of the original segment, etc.

It is noted that sometimes there may be more than one updated segment corresponding to a certain original segment (e.g., the content of the original segment is copied twice, thus generating two updated segments corresponding thereto). The opposite is also true: Sometimes there may be more than one original segment corresponding to a single updated segment (e.g., in order to calculate the content of a single updated segment it is possible to use content stored in two distinct original segments).

Figure 2A:
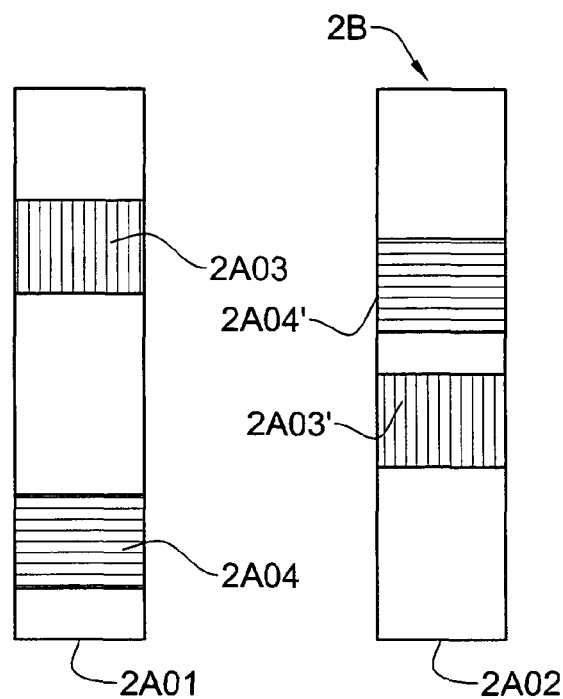
FIG. 2A illustrates an example of an original and updated versions having corresponding segments.

FIG. 2A illustrates a portion of a storage device wherein an original 2A01 and updated 2A02 versions have corresponding segments. According to this example, two segments 2A03 and 2A04 in the original version 2A01 correspond to segments 2A03' and 2A04', in the updated version 2A02, respectively, and vice versa: the segments 2A03' and 2A04' correspond to segments 2A03 and 2A04. According to this example, the content of the segment 2A03 is similar to the content of segment 2A03' and the content of the segment 2A04 is similar to the content of segment 2A04', although the segments 2A03' and 2A04' are positioned in the storage device differently (i.e., in different addresses) than the segments 2A03 and 2A04. According to the specific example, apart from changing the segments' positions, the relative order is also changed. That is, segment 2A03 physically precedes segment 2A04 in the storage device, but segment 2A04' physically precedes segment 2A03'.

Figure 2B:
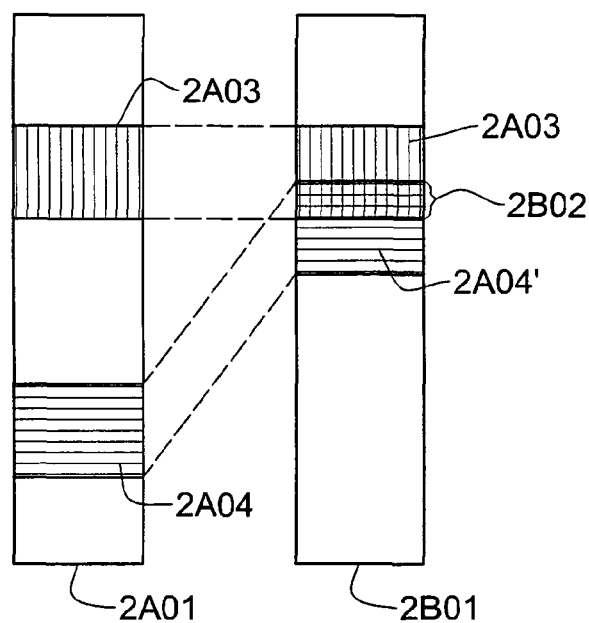
FIG. 2B illustrates how an ambiguous portion or a segment is formed when updating the original version of FIG. 2A to the updated version thereof.

FIG. 2B illustrates how an ambiguous portion of a segment is formed when updating the original version 2A01 of FIG. 2A to the updated version 2A02 thereof. According to this example, the content of segment 2A04 is moved before moving the content of segment 2A03, thus generating an intermediate version 2B01 in the storage device. It is illustrated by the intermediate version 2B01 that part of segment 2A04' overlaps part of segment 2A03, still positioned in its original position. Therefore, content of segment 2A04' overwrites part of segment 2A03's content. The overlapped original content of the segment's portion 2B02, being part of 2A03, is lost. This segment's portion (2B02) illustrates an "ambiguous portion", caused by an overlap, and it represents a "conflict" between two segments.

A conflict such as the conflict illustrated in FIG. 2B is known in the art as "write-before-read conflict". In a general manner, a write-before-read conflict arises when an original segment or a portion thereof, still required by the update process for further updating segments (such as segment 2A03 whose original content is required for the generation of segment 2A03's content), is being altered or lost before it is being used (in the example it is before copying the content of segment 2A03 for generating segment 2A03'). Unless otherwise noted, the term "conflict" is used below to refer, in short, to the term "write-before-read conflict".

Figure 2C:
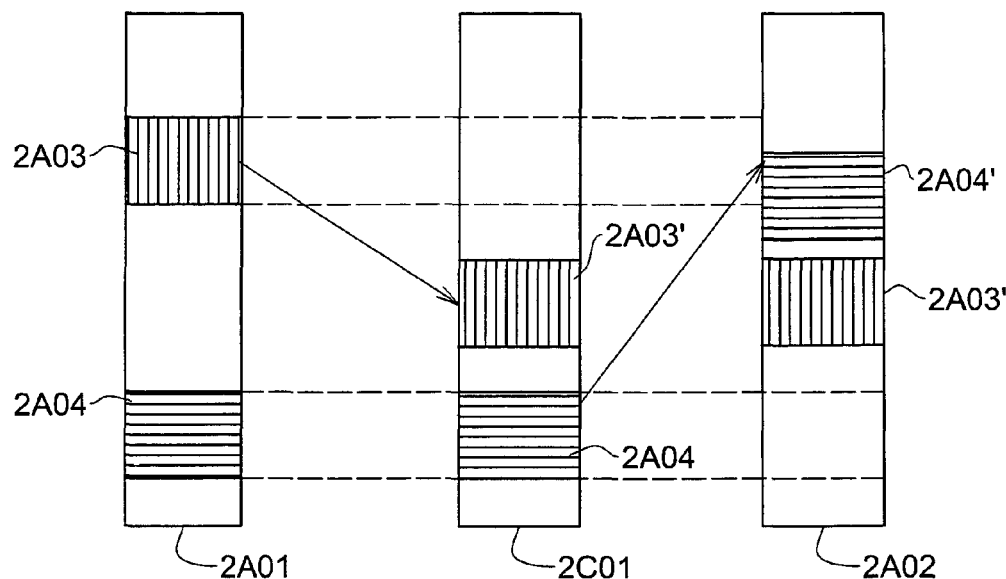
FIG. 2C illustrates one way, known in the art, to solve the write-before-read conflict of FIG. 2B.

It is currently known in the art that the content of segment 2A03 can be protected from conflict by copying it to its new position (that is, to segment 2A03'), before the content of segment 2A04' overwrites it, as illustrated in the example of FIG. 2C. An intermediate version 2C01, includes the original segment 2A04 and the updated segment 2A03', and then the content of segment 2A04 can be safely moved to its new position (segment 2A04') in the new version 2A02. FIGS. 2A, 2B and 2C provide an example of a copy-cycle for which a correct copy order can resolve conflicts.

Figure 2D:
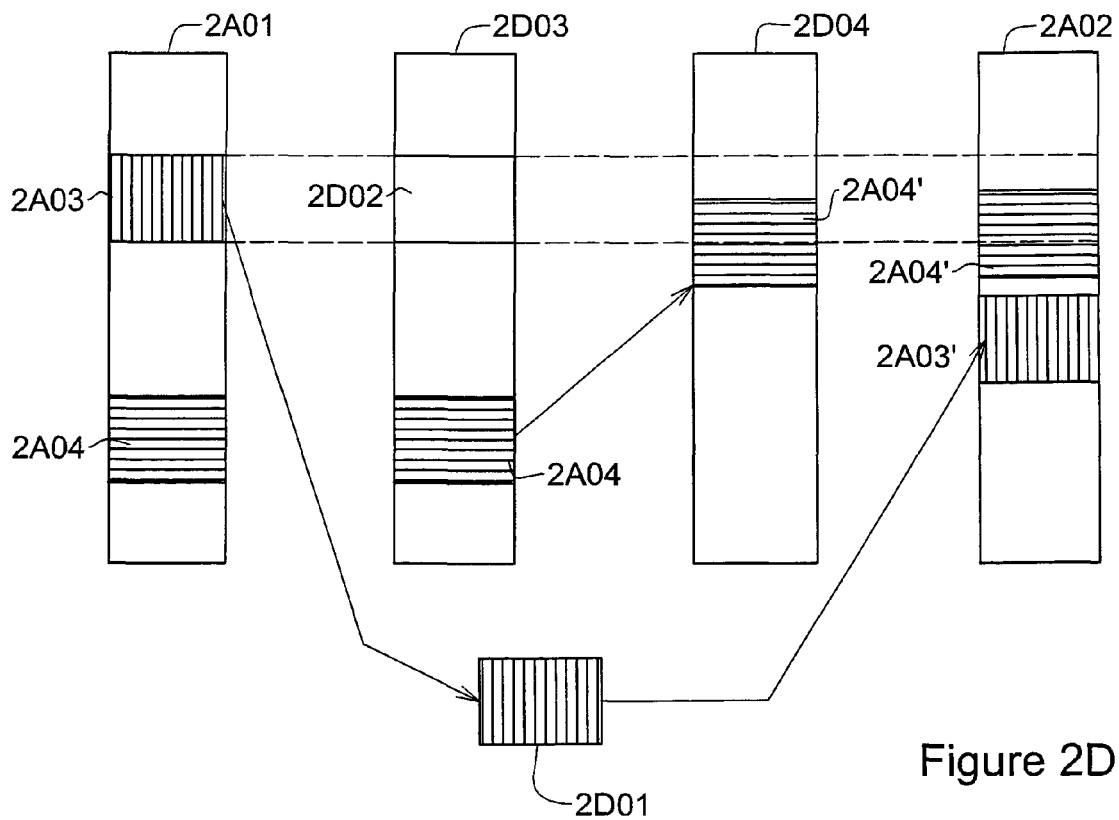
FIG. 2D illustrates an alternative way, known in the art, to solve the write-before-read conflict of FIG. 2B.

In an alternative example, illustrated in FIG. 2D, the content of segment 2A03 is copied to a memory area 2D01, named "backup buffer", "backup storage" or "protection buffer", turning the original content stored in the segment 2A03 into redundant content or released content, while the segment, or area, previously occupied by the released content is referred to as a "released area", marked in the intermediate version 2D03 as 2D02. This allows copying the content of segment 2A04 to its new position 2A04' that partially overlaps the released area 2D02 without overwriting the content of segment 2A03, as illustrated by the intermediate version 2D04. Now it is possible to copy the content of segment 2A03 (or more accurately, the copy thereof) from the protection buffer 2D01 into its position in the updated version, i.e., into updated segment 2A03' of the updated version 2A02. It is noted that according to the present example, the protection buffer is a storage area available to the update process, that is, this storage area does not include the area used for storing the original and/or updated content, not the storage area used for storing the update package.

Figures 3A, 3B:
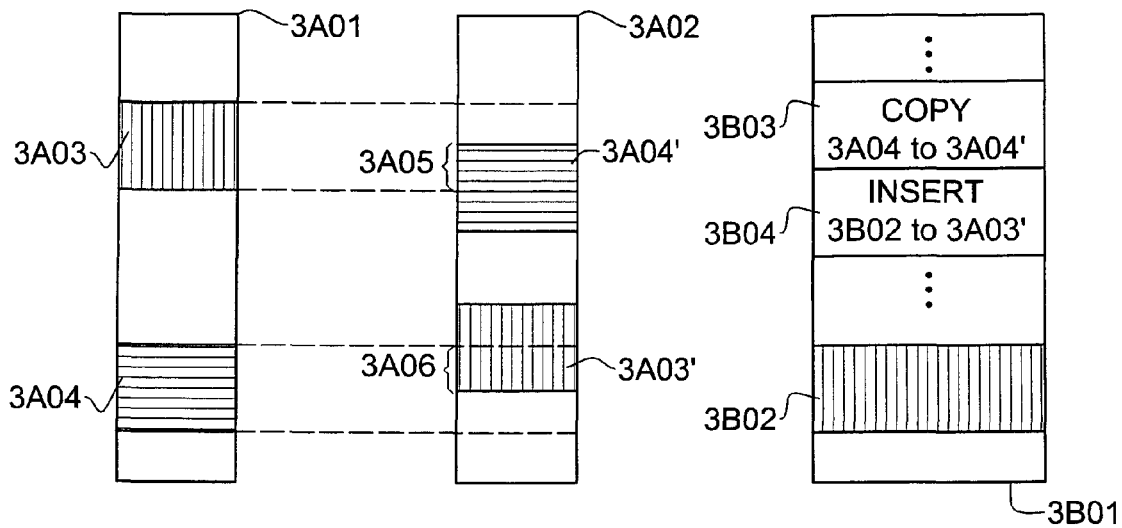
FIG. 3A illustrates other example of an original and updated versions having corresponding segments.
FIG. 3B illustrates an update package adapted for updating the original version of FIG. 3A to the updated version thereof.

FIG. 3A illustrates another example of an original version 3A01 and updated version 3A02 having corresponding segments 3A03, 3A04 and 3A03', 3A04' respectively. Similar to FIG. 2A, the updated segment 3A04' conflicts with original segment 3A03, illustrated by the ambiguous portion 3A05. However, unlike the example of FIG. 2A, here there is also a conflict between the updated segment 3A03' and the original segment 3A04, illustrated by the ambiguous portion 3A06. Therefore, a person versed in the art will appreciate that the solution of FIG. 2C, that is, changing the copy order, is not applicable here. It is noted that the example of FIG. 3A allows no copy order that can avoid the illustrated write-before-read conflicts.

FIG. 3A provides an example of a copy-cycle for which a correct copy order for resolving conflicts does not exist. It should be appreciated that other copy-cycles may exist, where there are more then two segments involved ("multiple-copy-cycles"). Even in such multiple-copy-cycles there is sometimes no conflict-resolving copy order. For example, a copy-cycle of four segments (A, B, C and D) could be created in the following way: updated A conflicts with original B, updated B conflicts with original C, updated C conflicts with original D and updated D conflicts with original A. It is appreciated that this copy cycle allows no conflict-resolving copy order.

U.S. Pat. No. 6,018,747, for example, tries to cope with read-before-write conflicts by identifying copy cycles, re-dividing the updated version into segments in a way that full segments conflict with other segments (thus giving rise to "ambiguous segments"), and replacing conflicting copy commands with add commands (add commands are sometimes referenced as "insert commands"). An add command requires that added, or inserted data will be available in the update package. Therefore, while replacing a copy command with an add command, the previously copied, now inserted content is inserted into the update package, thus enlarging its size.

It is appreciated that according to a different approach, the update process updating the original version 3A01 to the updated version 3A02 can use a method similar to the one illustrated in FIG. 2D for resolving the conflicts. More specifically, it can use a protection buffer for storing copies of the original conflicting segments.

It is noted that after determining that a conflict exists, it is possible to re-divide the segments in a way similar to U.S. Pat. No. 6,018,747, but instead of storing the original content of the ambiguous segment in the update package, it can be stored in a protection buffer.

FIG. 3B illustrates an update package 3B01 adapted for updating the original version 3A01 of FIG. 3A to the updated version 3A02 thereof. The update package 3B01 includes 3B02, a portion that includes content similar to the content of original segment 3A03, thus rendering the original content of segment 3A03 redundant. Now the update process can safely copy the content of segment 3A04 to its updated position, the corresponding segment 3A04', in accordance with the update command 3B03. After storing the copy of the original segment 3A04 in the updated segment 3A04', the content of segment 3A04 becomes redundant too, thus allowing the update process to overwrite it with the content stored in 3B02, which is a copy of the original content of segment 3A03. This is done, according to the current example, in accordance with the insert command 3B04 of the update package 3B01.

It should be noted that when there are multiple conflicts, it may be desired to select one of the conflicts to be resolved before resolving the other conflicts. The selection can be guided by optimization criteria. For example, the size of the protected segment can be used as an optimization criterion. If the size of the original segment 3A04 is smaller than the size of the original segment 3A03, then it may be desired to store a copy of segment 3A04's content, instead of storing a copy of the content stored in 3A03 as illustrated in FIG. 3B. Furthermore, instead of storing a copy of content stored in at least one conflicting segment, it is possible to store a copy of content stored in at least one ambiguous portion. If the sizes of the ambiguous portions are used as an optimization criterion, then according to the example it is possible to try storing only these (one or more) ambiguous portions whose size is smaller.

Figure 3C:
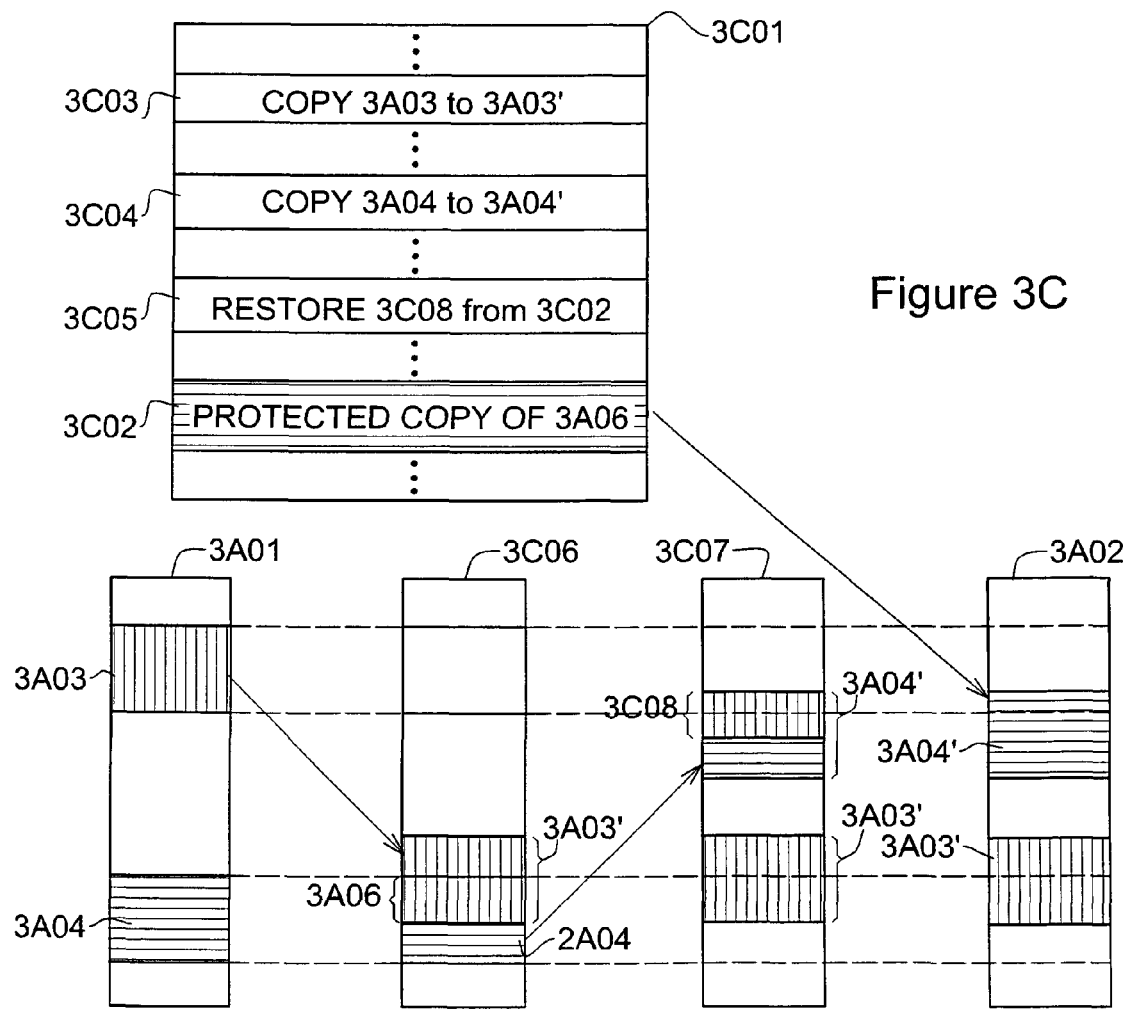
FIG. 3C illustrates updating the original version of FIG. 3A to the updated version thereof.

FIG. 3C illustrates updating the original version 3A01 of FIG. 3A to the updated version 3A02 thereof. While generating an update package 3C01, because the size of the ambiguous portion 3A06 is smaller then the size of the ambiguous portion 3A05, a copy of the original content of this ambiguous portion 3A06 is inserted into the update package (see 3C02). It is noted that 3C02 protects the content of portion 3A06, and hence it allows deleting (or modifying) the content thereof. Having done this, the update package 3C01 includes the following update commands: The update command 3C03 instructs the update process to copy the original content of 3A03 to generate the updated content of segment 3A03', overwriting portion 3A06 of segment 3A04, yet, the original content of portion 3A06 is protected by 3C02. Segment 3A03 becomes now a released segment; The update command 3C04 instructs the update process to copy the content of 3A04 to 3A04' (it is noted that the content copied in accordance with this command includes also a portion of the content stored in segment 3A03', that is, it includes a copy of the content that overwrote portion 3A06 as illustrated in the figure, represented by portion 3C08); and the update command 3C05 instructs the update process to insert the content stored in 3C02 (i.e., content similar to the original content of portion 3A06), into 3C08, for restoring the content of 3A04'. The insert command 3C05 is a "restoration update command" or shortly, a "restoration command" and in the figure it is represented as "restore" in order to emphasize this. Yet, it is noted that 3C05 could be an insert command (like 3B04 in FIG. 3B).

It is noted that this example assumes that the update is performed in accordance with a certain sequence (constituting an "update sequence"), wherein 3A03 is copied to 3A03', then 3A04 is copied to 3A04' and then 3C08 is restored. In this case the update sequence is influenced by the size of the ambiguous portion 3A06, which is smaller than the size of the ambiguous portion 3A05, and hence an update package including a copy thereof is smaller than an update package including a copy of 3A05.

Those versed in the art will appreciate that a variation of this example (i.e., the example of FIG. 3C) would avoid copying the original content of the whole segment 3A04 to generate the updated segment 3A04', followed by overwriting a portion thereof (3C08) by the protected content of 3C02 for restoring the content of 3A04'. It is possible to divide each of the two segments 3A03 and 3A04 into two segments, one that generates conflict (an ambiguous segment) and one that does not.

Figure 3D:
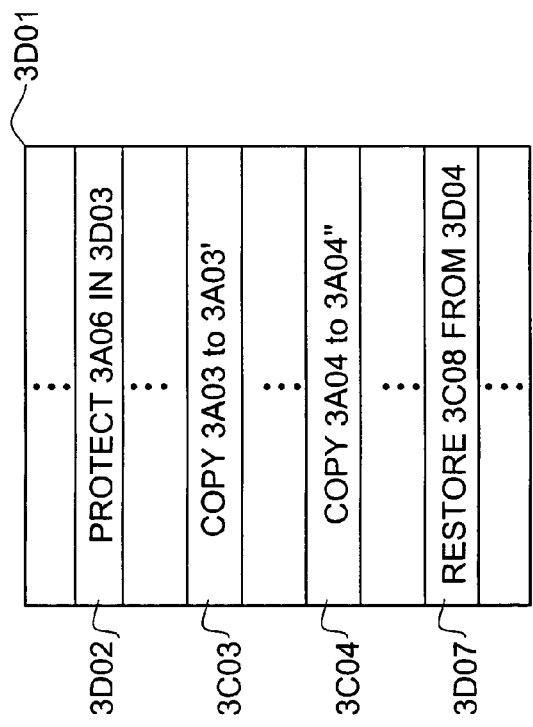
FIG. 3D illustrates updating the original version of FIG. 3A to the updated version thereof.
Figure 3D:
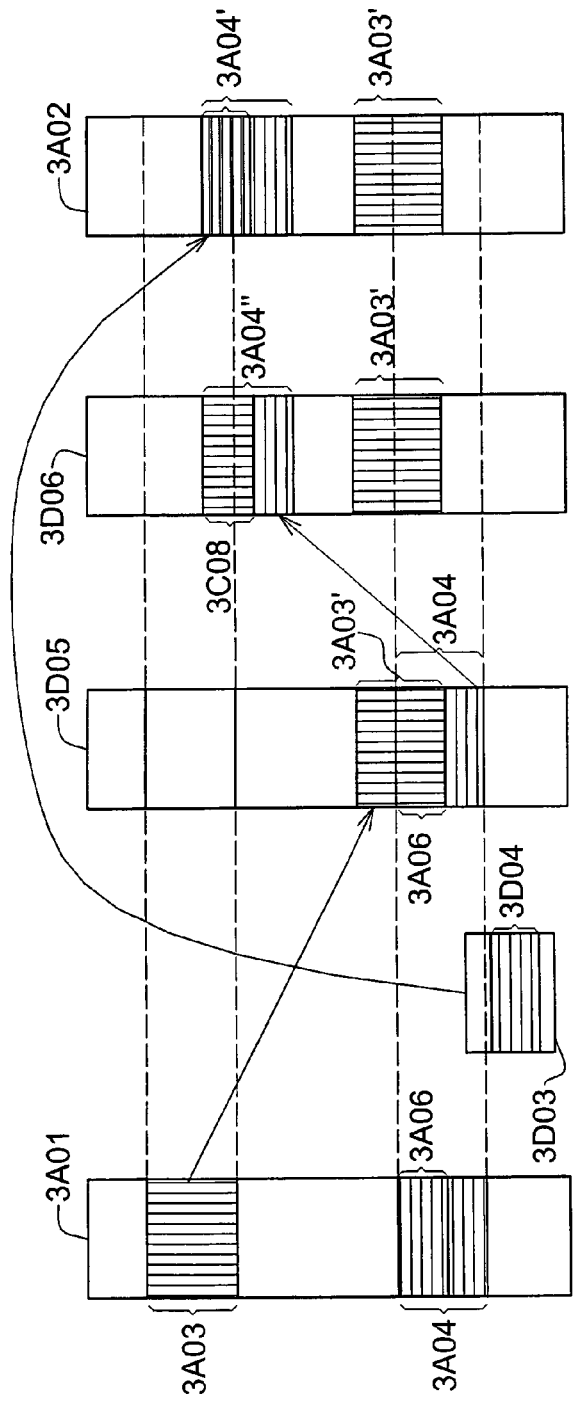

FIG. 3D illustrates yet another example for updating the original version 3A01 of FIG. 3A to the updated version 3A02 thereof. According to this example, content that needs to be protected from conflicts is stored in a protection buffer in the storage device.

It was already illustrated that according to this example there is a need to protect content of only one ambiguous portion. Again, this would be the ambiguous portion whose size is smaller than the other. In this case this would be the ambiguous portion 3A06.

When generating an update package 3D01, an update command 3D02 is inserted thereto, instructing the update process to store a copy of the original content of the ambiguous portion 3A06 in a protection buffer 3D03, protecting its content thereby. The command 3D02 constitutes a "backup command", a "protection update command", or shortly, a "protection command". The update process needs to perform this command before overwriting portion 3A06 with content of the segment 3A03'. The operation performed by the update process in accordance with a protection command is referred to as a "protection operation", "protect operation" or "backup operation" and it is noted that instead of using an explicit "protect" update command, a "copy" command could have been used.

When operating in accordance with the update command 3D02, the update process copies the content of portion 3A06 into the protection buffer 3D03, thus generating a protected portion 3D04. At this stage, the update process can safely operate in accordance with the update command 3C03 and copy the original content of 3A03 to the segment 3A03', overwriting the content of the ambiguous portion 3A06, whose original content is protected in the protection buffer 3D03. The version in the storage device becomes an intermediate version 3D05.

Following this, the update process can operate in accordance with the update command 3C04, and copy the content of segment 3A04 to its new position 3A04" in the intermediate version 3D06. It should be noted that at this stage the portion 3A06 includes content that was originally part of 3A03. Thus, when copying 3A04 to 3A04", a small portion of the original content of 3A03 is copied too, as illustrated by the portion 3C08. It is noted that the size of the portion 3C08 is similar to that of the ambiguous portion 3A06.

In order to generate the expected content of segment 3A04', the update process is required to restore the content of 3C08 to be similar to the original content of segment 3A06. In order to do so, the update process operates in accordance with the update command 3D07, thus copying the protected content of 3D04 to replace the content of the portion 3C08, thus giving rise to the expected content of segment 3A04'. It is noted that 3D07 is another example of a restoration command yet a copy command could have been used instead.

It was illustrated thus that sometimes original content needs to be protected (e.g., by storing a copy thereof in a protection buffer) before overwriting it with content of another segment. However, this in non-limiting and there are other circumstances requiring protection of original content. For example, the content of a segment (or a portion thereof) is sometimes modified during update. Yet, there may be other segments whose update requires the original content of the modified segment. For example, an original segment ("segment A") originally stores a number (such as 2), wherein the updated content thereof stores a different number (such as 4). The size of the updated content in this case stays similar to that of the original content. However, there may be another segment or portion thereof ("segment B") whose update requires, e.g., to add the value stored in the original segment A to a number stored in the original segment B, wherein the result of the addition is stored in the updated segment B. Even though the position of the updated segment A (or the portion storing the number in it) is kept similar to the position of the original segment A, indeed its content is changed (the original 2 is replaced by 4). Thus, by updating segment B after updating segment A, the update process must avoid using the updated content of segment A. This can be done by storing the original content of segment A in the protection buffer (or in the update package), thus protecting the original content of segment A.

It should be noted that the updated segment A in this non-limiting example corresponds to the original segment A. In addition, the updated segment B corresponds to both the original segment A and the original segment B.

Returning to the figures, it is noted that both the update packages 3C01 and 3D01 of FIGS. 3C and 3D, respectively, are referred to as conflict resolving update packages. However, when comparing the two examples illustrated in FIGS. 3C and 3D, it is noted that the update package 3D01 includes more update commands compared to the update package 3C01, as it includes also the backup update command 3D01. Backup commands may backup large quantities of content, and therefore they may slow down the update process. The embodiment of FIG. 3C does not require backup commands to be inserted into the update package 3C01, and therefore they allow the update process to be faster. On the other hand, the update package 3C01 is used for storing the protected data instead of the protection buffer 3D03, and therefore, as long as the size of the protected data is larger than the size of the respective backup command, the update package 3C01 is larger in size than the update package 3D01. Remembering that the update packages are conveyed to the updated devices, e.g., by transmitting them over communication lines, a larger update package may be a limitation.

Figure 4:
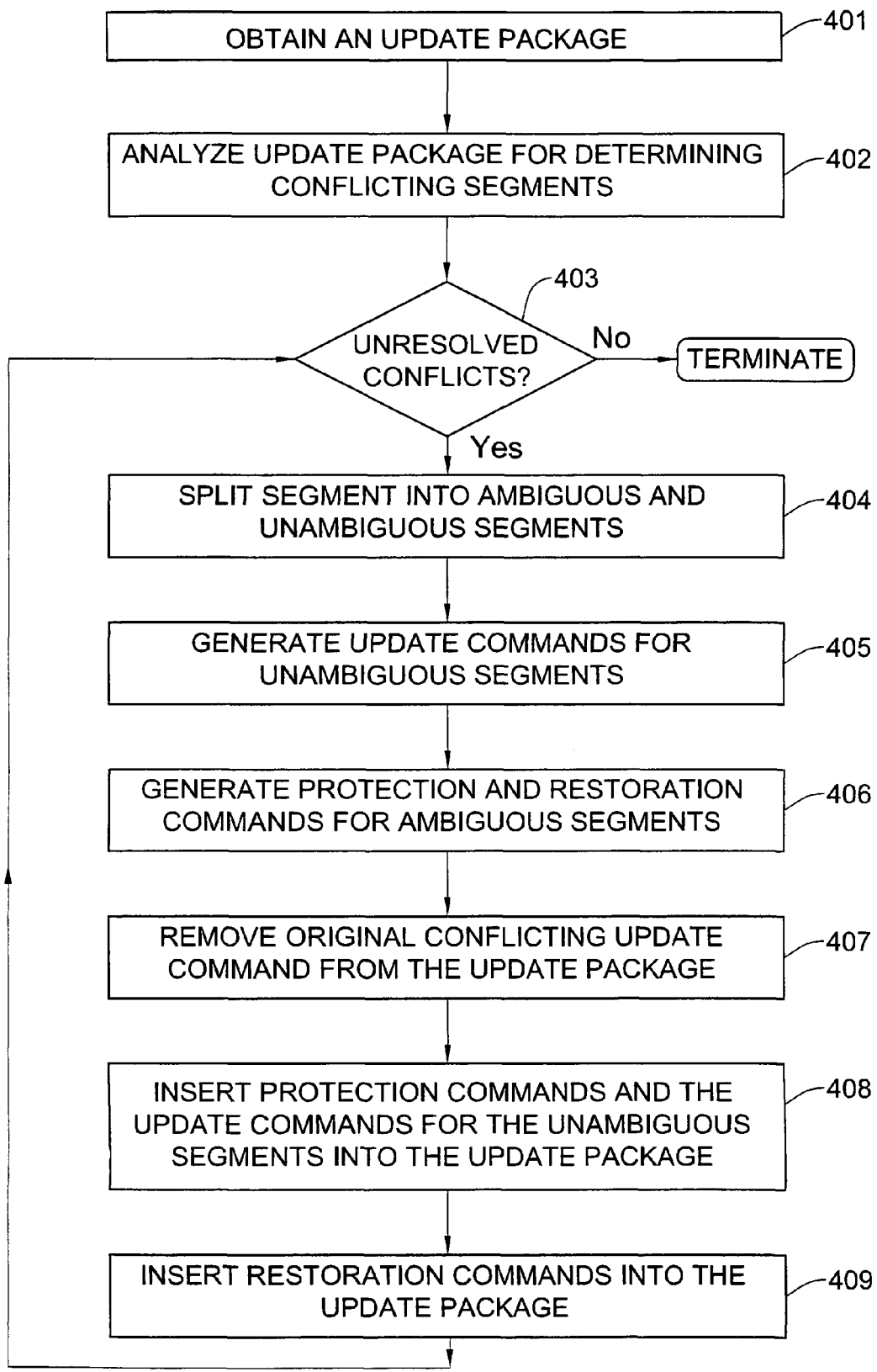
FIG. 4 is a flowchart illustrating generation of a conflict resolving update package.

FIG. 4 is a flowchart illustrating generation of a conflict resolving update package. The flowchart corresponds to embodiments using a protection buffer for protecting content of conflicting segments. In 401 an update package is obtained. The update package can be generated by any way known in the art (see, for example, U.S. Pat. No. 6,546,552, WO 2004/114130, WO 2005/003963 and diff). The update package can be generated during 401 in order to form a basis for the presently referenced flowchart (of FIG. 4), or it can be pre-generated and obtained by any available method (such as reading it from a storage device, receiving it from communication lines, via inter-process communication, etc.). Then, in 402, the update package is analyzed in order to identify segments-which form conflicting segments. This can be done by constructing a digraph and identifying cycles (or in other words, "copy-cycles") therein, as described, e.g., by U.S. Pat. No. 6,018,747. It is noted that conflicting segments include ambiguous portions whose sizes can be similar or smaller than the size of their respective segments, thus leaving zero or more unambiguous portions in the segments.

The unresolved conflicts are handled one after the other, as indicated by 403. In 404 a selected segment that includes an ambiguous portion is split into ambiguous and unambiguous portions, thus giving rise to two segments, one ambiguous and one unambiguous. It is noted that sometimes a segment includes more than two portions (more than one ambiguous and/or more than one unambiguous). For example, when the ambiguous portion is in the middle of the segment, there can be at least two unambiguous portions and one ambiguous portion. In such a case the segment would be split into more than two segments.

In 405 a new update command is generated for each of the unambiguous segments, and in 406 a protection command and a restoration command are generated for each ambiguous segment. In 407 the original update command that generated the conflict is removed from the update package and in 408 the new update commands, as well as the protection commands are inserted into the update package, replacing the removed update commands. In 409 the restoration commands are inserted into the update package, instead of the insertion commands inserted, for example, in accordance with U.S. Pat. No. 6,018,747.

It is noted though that instead of removing the original update commands and inserting newly generated update commands in replacement thereof (see, e.g., 405, 406, 407 and 408), it is possible to modify the original update command so as to refer to only the unambiguous portions (which become unambiguous segments).

Figure 5A:
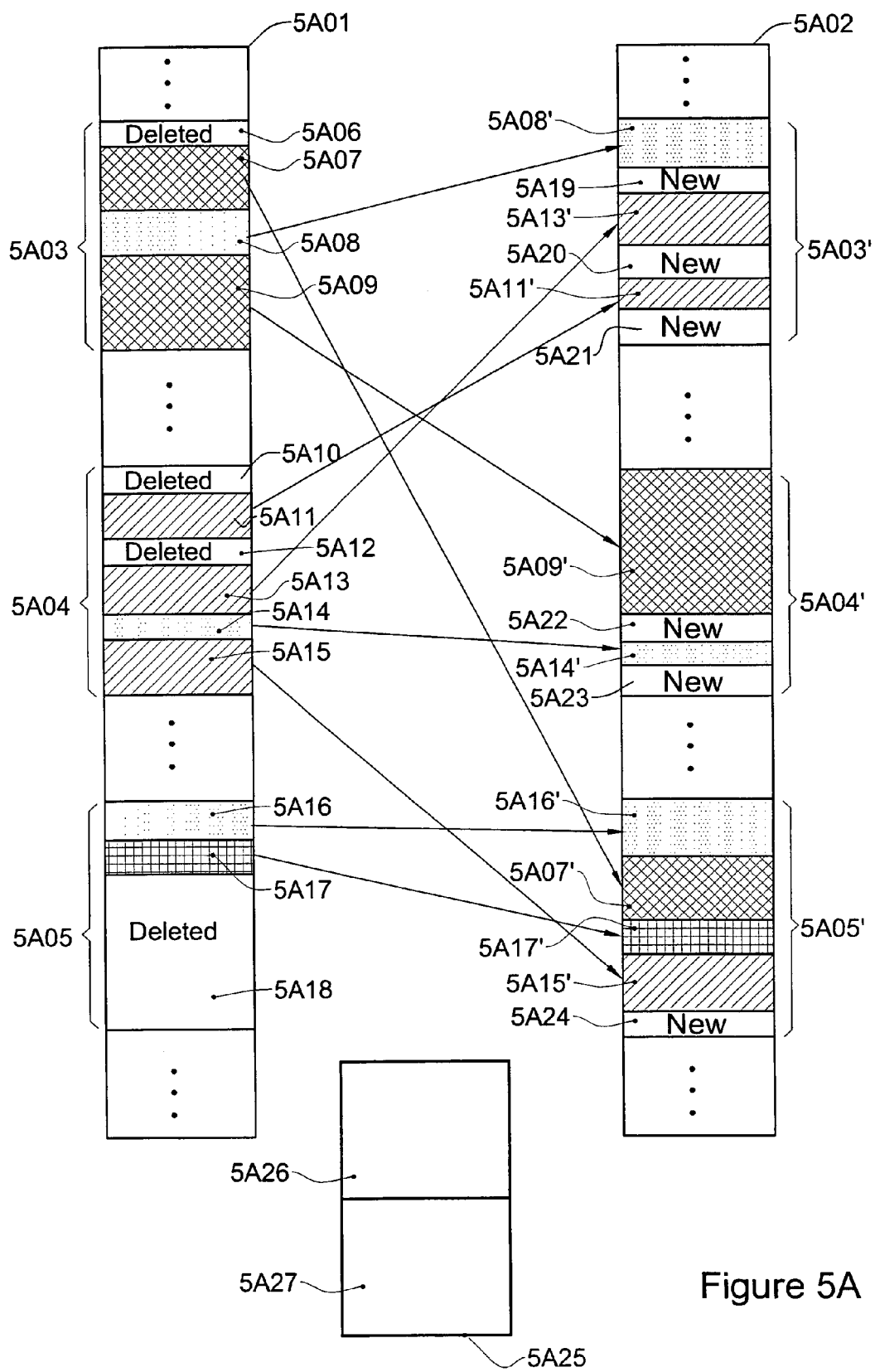
FIG. 5A is a schematic illustration of another example of an original version, and the updated version thereof.

FIG. 5A is a schematic illustration of another example of an original version 5A01, and an updated version 5A02 thereof. It should be appreciated that the updated version 5A02 occupies basically the same blocks in the storage device previously occupied by the original version 5A01. The original version 5A01 occupies at least three storage blocks, specifically referenced as 5A03, 5A04 and 5A05. The updated version 5A02 occupies at least the same blocks. However, in order to differentiate between original and updated content, 5A03' denotes block 5A03 when updated content is stored therein; 5A04' denotes block 5A04 when updated content is stored therein; and 5A05' denoted block 5A05 when updated content is stored therein.

The block 5A03 includes four segments: 5A06, 5A07, 5A08 and 5A09; The block 5A04 includes six segments:

5A10, 5A11, 5A12, 5A13, 5A14 and 5A15; and the block 5A05 includes three segments: 5A16, 5A17 and 5A18.

During update, the content stored in segment 5A06 is deleted and thus it has no corresponding segment in the updated version 5A02. Other deleted segments are 5A10, 5A12 and 5A18. Furthermore, the content stored in segment 5A07 is moved (copied) to block 5A05', thus generating segment 5A07'. The content stored in segment 5A08 is left in block 5A03', constituting segment 5A08', but as segment 5A06 is deleted, the segment 5A08' (or at least part thereof) now occupies addresses in the block that previously were occupied by the content of 5A06, or in other words, it becomes the first segment in the block, which belongs to the updated version 5A02. The content stored in segment 5A09 is copied from block 5A03 to block 5A04', constituting segment 5A09' therein. It is noted that the segments 5A07', 5A08' and 5A09' are segments in the updated version that correspond to segments 5A07, 5A08 and 5A09, respectively.

The content of segments 5A11 and 5A13 are copied to block 5A03', generating the corresponding segments 5A11' and 5A13' therein, respectively. Yet, in the original version segment 5A11 precedes segment 5A13, while in the updated version 5A02 their respective order changes and segment 5A13' precedes segment 5A11'. In addition, content is inserted into three new segments (5A19, 5A20 and 5A21) in block 5A03', and it is noted that none of these new segments (5A19, 5A20 and 5A21) correspond to segments in the original version. Similarly, content is inserted into two new segments (5A22 and 5A23) in block 5A04' and into one new segment (5A24) in block 5A05'. Neither 5A22, 5A23 nor 5A24 correspond to segments in the original version.

The content stored in segment 5A14 of block 5A04 is left in the same block 5A04', giving rise to the corresponding segment 5A14', and the content stored in segment 5A15 of the same block (5A04) is moved (copied) into block 5A05', constituting segment 5A15'.

The segment 5A16 of block 5A05 corresponds to segment 5A16' in block 5A05'. Similarly to the segment 5A16, which is the first segment in the block 5A05 being part of the original version 5A01, the segment 5A16' is the first segment in block 5A05' being part of the updated version 5A02. However, it is noted that the updated content of segment 5A16' is not necessarily identical to original content stored in segment 5A16, and in this case the size of the updated content of 5A16' is larger than the size of the original content of 5A16. For example, an update command can insert one or more zeros (O's) along the content of the updated segment. Such a command could, for example, insert a hundred zeros after each original thousand bytes. The update command allowing updating the content of 5A16 to the content of 5A16' can be indicative of any other transforming operation, such as "convert lower case characters to lower case character" etc. The segment 5A17 of block 5A05 corresponds to segment 5A17' of block 5A05', but their physical positions in the block are different.

Although not specifically noted before, there may exist additional corresponding segments, such as 5A14 and 5A14', whose physical position within their respective blocks have changed.

It is noted that according to this example there is a protection buffer 5A25 available for the update process. As the size of a protection buffer is not limited by the invention, in the present example of FIG. 5A the protection buffer size is two storage blocks wherein one storage block is referenced as 5A26 and the other as 5A27. Yet, it is noted that this is a non limiting example, and the protection buffer can be of any size.

The invention is adapted to storage devices including blocks, wherein writing updated content into a block affects other content stored therein. Hence, as of access efficiency considerations, it is possible to group together update commands writing content into a specific block, operating in accordance therewith, before operating in accordance with update commands writing content into a different block. In the present example of FIG. 5A, the update process updates block 5A05', then block 5A04' and then block 5A03'.

Yet, in RAM (Random Access Memory) there is no such limitation relating to storing content in segments of the same block. RAM includes no blocks and hence, content written to the RAM does not affect other content written therein. For example, and there is no requirement to erase content stored in a block before writing any piece of content (e.g., a segment) thereto and similarly, there is no requirement to write the complete content of a block during one write operation. Hence, it is possible to generate a copy of an updated block in RAM, one segment after the other (operating in accordance with the update commands), then writing the content of the complete block into the block in the storage device including blocks. In addition, there is no special importance to the order of the update, commands relating to one updated block, as long as access efficiency is considered.

That is, the update package includes the commands "insert 5A24", then "copy 5A15 to 5A15'", followed by "copy 5A17 to 5A17'", "copy 5A07 to 5A07'", and "update 5A16 to yield 5A16'". Yet, as for access efficiency considerations, this is equivalent to "copy 5A17 to 5A17'", followed by "update 5A16 to yield 5A16'", "copy 5A15 to 5A15'", "copy 5A07 to 5A07'" and "insert 5A24".

It was noted, with reference to FIG. 5A, that the original content stored in segment 5A13 is required for updating segment 5A13' in block 5A03'. Considering the update sequence, it is appreciated that block 5A03' is updated further to updating block 5A04'. That is, the content of the updated block 5A03' (including segment 5A13') is not yet generated while the update process operates in accordance with the update command "copy 5A09 to 5A09'", overwriting the original content of segment 5A13 (or at least a portion thereof). Therefore, it is appreciated, that upon reaching the "copy 5A13 to 5A13'" command, the content stored in segment 5A13 will already be updated content being part of segment 5A09', and not the original content of 5A13. Hence, the "updated" content to be stored in 5A13', in this case, would not be the expected content (it would not be a copy of the original content of 5A13). In order to avoid this error, the original content stored in 5A13 needs to be protected (e.g., in the protection buffer) before overwriting it with segment 5A09'.

Understanding this, it is possible to determine that before overwriting original content stored in a segment, this original content should be protected if it is required for at least one update command yielding updated content to be stored in a block further in the update sequence.

It was also noted with reference to FIG. 5A, that the content of segment 5A17 is copied into segment 5A17' of the same block (5A05). 5A17' appears to precede 5A17, i.e., the updated content of 5A17' does not overwrite the original content of 5A17. Hence, it appears, prima facie, that the original content of 5A17 is implicitly protected by 5A17', and this original content does not require explicit protection (e.g., in a protection buffer). However, in those cases when the updated device has a, storage device including blocks, such as flash memory, it is appreciated that usually a copy of the updated content is generated, e.g., in RAM (Random Access Memory), and after completing the updated content generation of the whole updated block (5A05' in this case), the updated content is copied from the RAM to the updated block 5A05' further to deleting the content of original 5A05. It is appreciated thus that while overwriting the original content of 5A05 with the updated content of 5A05', if the writing operation fails further to success of the delete operation, the original content of 5A17 will be lost, regardless of the fact that it is not overwritten by 5A17'. Therefore it should be noted that protection is required also for purpose of reliability, in those cases when the content of the original segment is required to update the content of a corresponding updated segment in the same block.

On the other hand, segment 5A15 is copied into segment 5A15' of block 5A05'. This is done while updating block 5A05', i.e., before updating blocks 5A04' and 5A03'. Hence, it can be appreciated that upon updating block 5A04' and overwriting the original content of 5A15 with the updated content of segments 5A23, 5A14' and possibly also 5A22, the original content of 5A15 has already been copied into 5A15', which is in a block preceding 5A04' in the update sequence. Therefore, in the example of FIG. 5A there is no need to explicitly protect the original content of 5A15.

Even further, if in the example there was an additional update command copying the original content of 5A15 into a corresponding segment in block 5A03', in addition to the presently existing copy command, copying the content of 5A15 into 5A15' in block 5A05' (it is noted that block 5A03' follows block 5A05' in the update sequence), there would still be no requirement to explicitly protect the content of 5A05. Although block 5A03' follows block 5A04' in the update sequence, hence overwriting the original content of 5A15 before updating block 5A03', it is possible to use the content stored in 5A15' instead of a copy thereof explicitly stored in the protection buffer.

Hence, there is no requirement to explicitly protect content of a segment if there is at least one update command copying the content thereof in a block that precedes the original block of the original segment in the update sequence.

Understanding that, it is appreciated that in block 5A05 the segments 5A16 and 5A17, or portions thereof, require protection. In block 5A04, the segments 5A11, 5A13 and 5A14, or ambiguous portions thereof require protection, while in 5A03 it is 5A08, or an ambiguous portion thereof that requires protection.

It is noted that the example of FIG. 5A is non-limiting. In the example the update package allows the update process to update the original version 5A01 to the updated version 5A02, while first executing update commands for updating block 5A05', then update commands for updating block 5A04' and then update commands for updating block 5A03'. Alternatively, after updating block 5A05' it is possible to update 5A03' and finally block 5A04'. It is still possible to update block 5A04' first, followed by block 5A03' and 5A05' etc. It should be noted that according to this example there are six different update sequences allowed. Generally, there are n! possible update sequences, wherein n is the number of blocks that include modified data being part of the new version. All these n! update sequences give rise to the same updated version. An "update sequence" or "update order" is the order in accordance with which blocks of the updated version are updated (or written).

According to the invention, an operating environment of an updated device can be pre-configured to allocate one or more areas in the storage device 103 that are used for backup and/or protection purposes of operations performed by any software executed by the device. Updating content is one example for such an operation. Such an area is the "protection buffer". According to one embodiment described by way of example with reference to FIG. 3D, it is possible to protect original content of a segment by storing a copy thereof in a protection buffer 3D03 in the storage device 103 thus reducing the size of the update package, compared to a package storing content of protected segments therein.

According to another embodiment, content of more than one segment (or one or more portions thereof) can be stored in the protection buffer. It is noted that if after storing portions the protection buffer includes unused area, it is possible to use this unused area for storing copies of content stored in additional segments requiring protection (or portions thereof). These additional protected segments can be stored in the current block or they can be stored in other blocks in the storage device. That is, it is possible to store segments or portions thereof in the protection buffer, instead of copying complete blocks thereto.

It was noted before that it is possible to split an ambiguous segment into several segments, i.e., an ambiguous segment can be split into one or more ambiguous segments and one or more non-ambiguous segments. Then the update commands are adapted to correspond to the split segments. Realizing this, it is noted that hereinafter, instead of speaking of an ambiguous segment and/or an ambiguous portion thereof, segments (and/or ambiguous segments) will be discussed.

Notwithstanding, when further discussing the examples of FIGS. 5B and 3C below, instead of splitting the segments to sub-segments (ambiguous and/or unambiguous), in order to keep the description as simple as possible, reference will be made to the complete "original" segments. For example, it appears from FIG. 5A that 5A17 should be split into two portions or sub-segments; one is overwritten be the updated content of segment 5A16' and the other by the updated content of segment 5A07'. Yet, the description below refers to protecting the original content of the complete segment 5A07.

Figure 5B:
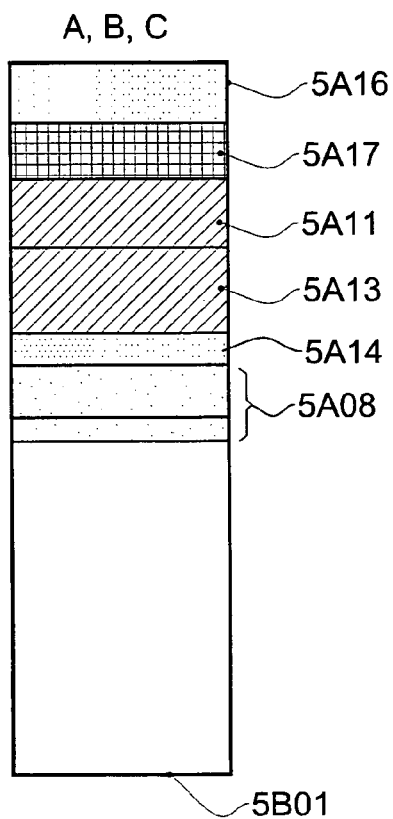
FIG. 5B is a schematic illustration of a protection buffer used while updating the original version of FIG. 5A to the updated version thereof, in accordance with one embodiment of the invention.

FIG. 5B is a schematic illustration of a protection buffer 5B01 used while updating the original version of FIG. 5A to the updated version thereof, in accordance with one embodiment of the invention. In this example the size of the protection buffer 5B01 is two storage blocks, as is the case with the protection buffer 5A25 of FIG. 5A, however, this is non-limiting and the protection buffer can be of any applicable size. It is noted that when the update process begins operating, the protection buffer is empty, or in other words, the size of the unused area thereof is similar to the size of the protection buffer.

In the current example the selected update sequence is 5A05', 5A04' and then 5A03'. Thus, when updating the original content of block 5A05' (which means overwriting the original content stored in 5A05), the original content of segment 5A16 requires protection. The size of segment 5A16 is smaller than the size of the protection buffer, and therefore the original content of segment 5A16 is copied thereto.

The segment 5A17 also requires protection. Because the size of segment 5A17 is smaller than the unused area of the protection buffer, the original content of segment 5A17 can also be copied thereto. Now, when all the segments of 5A05 that require protection are protected, the content stored in block 5A05 can be safely overwritten by the updated content of 5A05' (that is, by the updated content of segments 5A16', 5A07', 5A17', 5A15' and 5A24). As already explained, copying original content into the protection buffer provides protection to ambiguous segments as and/or reliability of the update process.

Furthermore, before updating block 5A04' (thus overwriting the original content stored in 5A04), and as long as there is unused area in the protection buffer, the original content of the segments 5A11, 5A13 and 5A14 is copied thereto, while there is no need to further protect the original content of segment 5A15, and therefore its content is not copied to the protection buffer (5A15 is implicitly protected by 5A15', as was previously explained with reference to FIG. 5A). In addition, before updating block 5A03', and as long as there is sufficient unused area in the protection buffer, the original content of 5A08 should also be copied thereto.

It is noted though that now the used area of the protection buffer 5B01 is a little larger than the size of one storage block. If the size of the protection buffer would have been only one storage block, thus, there would not have been enough unused area to store the copy of segment 5A08 therein. When the protection buffer does not have sufficient unused area for protecting all segments requiring protection, their content needs to be backed up in alternative storage areas, such as the update package itself as described in U.S. Pat. No. 6,018,747 or with reference to FIG. 3C.

Figure 5C:
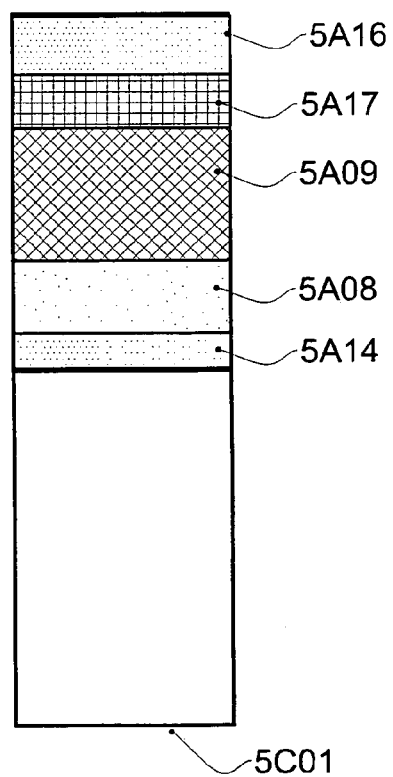
FIG. 5C is a schematic illustration of a protection buffer used while updating the original version of FIG. 5A to the updated version thereof, in accordance with another embodiment of the invention.

FIG. 5C is a schematic illustration of a protection buffer 5C01 used while updating the original version of FIG. 5A to the updated version thereof, in accordance with another embodiment of the invention. According to this embodiment the update sequence is selected in order to reduce the number of protection operations or the area used by protected content. For example, the usage of the protection buffer 5C01 illustrates the protection operations required when the update sequence is 5A05', 5A03' and finally 5A04'. As was previously explained with reference to FIG. 5B the original content of segments 5A16 and 5A17 is copied into the protection buffer before overwriting them with the updated content of block 5A05'. Before updating block 5A03', and with reference to the disclosure of FIG. 5B, it should be appreciated that the segment 5A07 does not require protection. Hence, the content of segments 5A08 and 5A09 that needs protection, is copied into the unused area of the protection buffer 5C01 without copying the content of 5A07.

Now, turning to block 5A04', it should be understood that the segments 5A11, 5A13 and 5A15 do not require explicit protection, as their content was copied before to blocks 5A03' and 5A05' (their original content is implicitly protected). The only original content in block 5A04 that requires protection is the original content stored in segment 5A14, and therefore this content is copied into the unused area of the protection buffer 5C01.

By comparing the usage of the protection buffer 5B01 with that of the protection buffer 5C01 it is possible to see that the protection buffer 5C01 includes content of fewer segments compared to the protection buffer 5B01 (five segments in 5C01, unlike six segments in 5B01). A person versed in the art would appreciate that this reduction in the number of protected portions results due to the implicit protection of three segments (5A11, 5A13 and 5A15) achieved by updating block 5A03' before block 5A04'.

In addition, it is noted that the used area of the protection buffer 5C01, after protecting required original content of segments in all three blocks is smaller than the used area of the protection buffer 5B01. Again, this is due to having larger segments implicitly protected by selecting the above-mentioned update sequence (5A05', 5A03' and then 5A04').

Generally, thus, by selecting a certain update sequence it may be possible to reduce the number of backup operations and/or the protection buffer space required during the update process. Bearing in mind that backup operations are time consuming, reducing the backup operations is beneficial in achieving a faster update process. In addition, taking into account that writing data into blocks in a storage device including blocks is time consuming, it should be appreciated that reducing the space used for protection (and hence possibly also the number of blocks used in the protection buffer) can also be beneficial in achieving a faster update process.

Furthermore, it is noted that the update sequence affects the time during which it is required to keep a copy of an original content of a segment in the protection buffer. In the example of FIG. 5A, e.g., segment 5A09 is required for updating block 5A04'. If the update sequence determines that block 5A03' should be updated before block 5A04', then the original content of segment 5A09 should be copied into the protection buffer. It is possible (although not shown in the figure) that between updating blocks 5A03' and 5A04' other blocks (additional blocks that not illustrated) are updated, while 5A04' is the last block updated in accordance with the update sequence. In such a case it should be appreciated that it is required to keep the protected content of segment 5A09 in the protection buffer until block 5A04' is updated, or in other words, almost until the end of the update process. During all this time the protected content of segment 5A09 occupies area of the protection buffer.

However, it is possible to modify the update sequence in this case, updating block 5A04' before the other segments. It was already noted that if 5A09' includes content identical to the content of 5A09 it can be used as implicit protection thereof, and therefore in this case it would be possible to free (or reuse) the area of the protection buffer occupied by the protected content of 5A09 after updating block 5A04'.

Yet, even in those cases when the content of 5A09' is different from the content of 5A09, it is still possible to select an update sequence that allows updating the blocks whose update depends on the original content of 5A09 before updating the rest of the blocks, thus allowing release or reuse of the area in the protection buffer previously occupied by the protected copy of the original content of 5A09.

Before proceeding with the description of an embodiment for determining an update sequence, it should be noted that "Size" of a segment is the number of bytes occupied by the segment. However, this is non-limiting and it is possible to measure the size of a segment by any other applicable measure, such as bits, words, etc.

In addition, every original block has a dependency value, denoted as DEP(block). The original segments of a block B that correspond to updated segments in the updated version constitute "original corresponding segments". Understanding that the segments in an old block that potentially require protection are original corresponding segments, the dependency value of a block is determined as the total size of all the original corresponding segments included therein. Initially the DEP value of a block is given by Equation 1.

$$DEP(B_i) = \sum_{j=1}^{m} \text{Size}(CS_j) \qquad \text{Equation 1}$$

Wherein:

$B_i$ is an i'th block in a storage device (it is noted that blocks mentioned herein are updated blocks, i.e., blocks whose original content is overwritten by updated content, while it is unnecessary to protect content stored in those blocks that are not updated);

m is the number of segments in a block that potentially require protection (m>=0); and $CS_j$ is an updated segment in $B_i$ that corresponds to an original segment, wherein j=1, 2, . . . , m.

If m=0 then there are no corresponding segments in $B_i$, and therefore DEP($B_i$)=0.

For example, in FIG. 5A, the initial dependency of block 5A04 is:

DEP(5A04)=size(5A11)+size(5A13)+size(5A14)+size (5A15)

Figure 6:
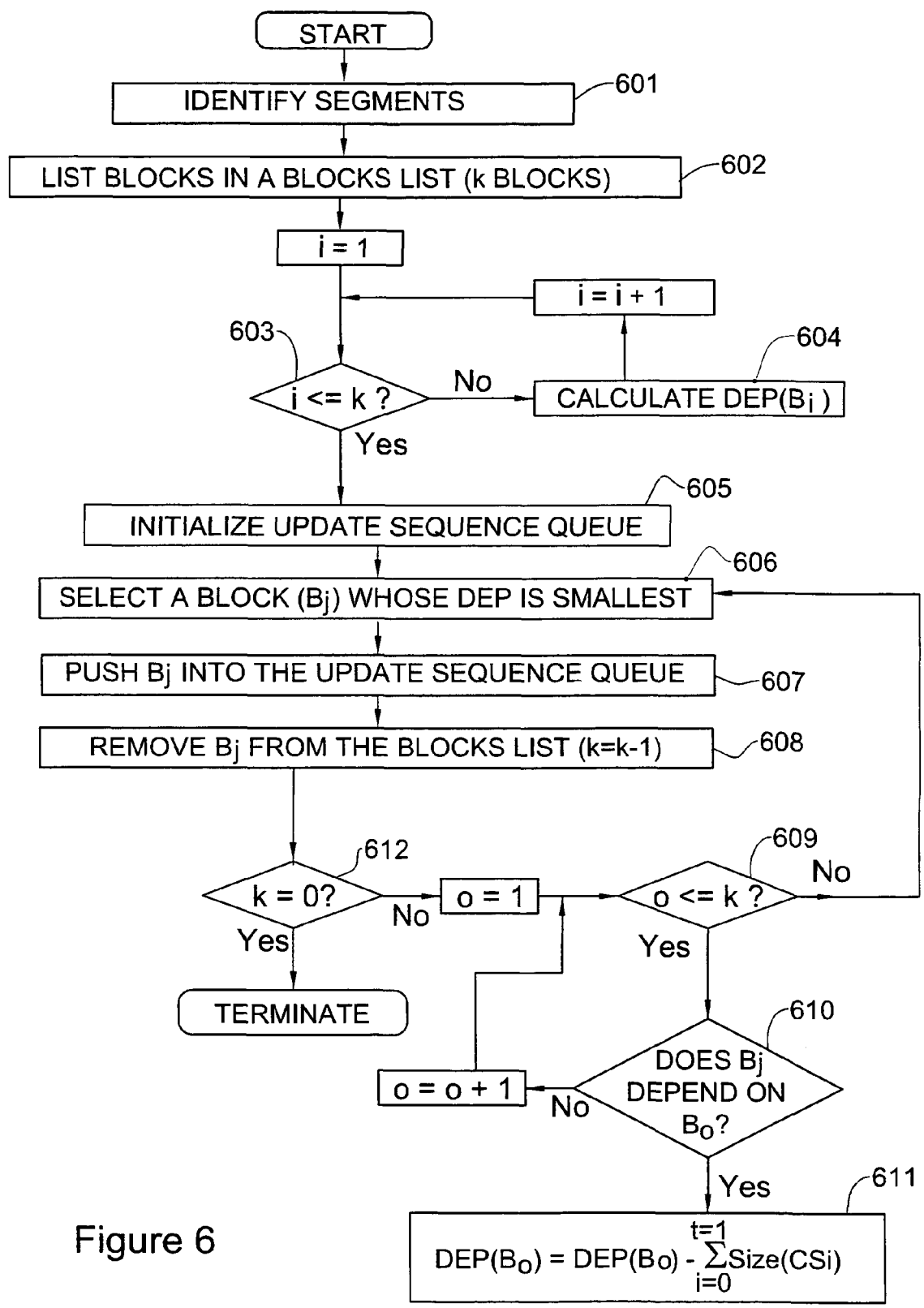
FIG. 6 is a flowchart illustrating in detail one embodiment for determining an update sequence.

FIG. 6 is a flowchart illustrating in detail one embodiment for determining an update sequence. It is noted that an update sequence determined by the illustrated embodiment is determined in order to reduce the area or space used by protected content. It should also be understood that being the order in accordance with which the updated blocks are updated in the storage device, an update sequence is always determined in connection with an update package (as it is the update package that determines the update sequence in accordance with which the update process operates).

In 601 a pre-prepared update package is analyzed in order to identify corresponding segments, e.g., by identifying original segments whose content is copied into segments of the updated version and/or updated segments whose content is calculated based on content of original segments etc. It is noted that non-corresponding segments included in the updated version (i.e., segments that have no correspondence with segments in the original version), such as new content that is inserted into the updated version without any correspondence to the original version, does not necessarily affect the update sequence. Alternatively, the corresponding segments can be pre-identified (see, for example, FIG. 7), in which case 601 can be skipped.

In addition, a pre-prepared update package is not a prerequisite. If there is no pre-prepared update package, it is possible to generate one, for example, by utilizing a diff tool as is known in the art or by any other way such as by the methods described in U.S. Pat. No. 6,546,552, WO 2004/114130 or WO 2005/003963.

In 602 all the blocks in the storage device that include updated content being part of the updated version are listed in a list denoted "blocks list", wherein k is the number of listed blocks. For every block i (i=1, 2, . . . , k) in the list (see 603) DEP($B_i$) is calculated (in 604).

According to the illustrated embodiment, blocks will be listed in an "update sequence queue", when the block whose dependency is lowest will be inserted thereto first (and therefore it will be the first to be retrieved). Thus, in 605 an empty queue is initialized. Yet, this embodiment is non-limiting and other data structures, such as a stack, can be used as well, as can be appreciated by those having skills in the art. The first block to be updated in accordance with the update sequence, i.e., the first block to be pushed into the update sequence queue, is the block whose DEP is lowest.

In 606 the block in the blocks list whose DEP value is the smallest is selected. It is noted that if there are several (more then one) blocks with the same smallest DEP value, then one of them is selected, e.g., according to the smallest i. The selected block is denoted $B_j$. In 607 $B_j$ is pushed into the update sequence queue and in 608 it is removed from the blocks list. Then, in 612, if the blocks list is empty (k=0), process terminates.

It was already explained that it is possible that $B_j$ depends on other blocks. That is, there are possibly updated segments in $B_j$ (or more specifically, in the updated version of $B_j$) whose corresponding original segments are in other original blocks in the storage device. For each such other block $B_o$ that is listed in the blocks list, segments corresponding to segments in the updated version of $B_j$ are identified (it is possible to recognize the segments according to the start and end addresses of the other blocks listed in the blocks list) and their size is reduced from DEP($B_o$).

In order to do so, each block $B_o$ listed in the blocks list (see 609 and 610) is tested to see whether $B_j$ depends on it or not (i.e., whether the updated content stored in $B_j$ includes a segment whose corresponding source segment is in the old version of that block $B_o$). If $B_j$ depends on the tested block $B_o$, in 611 the depending segments are identified and their total size is reduced from the dependency value (DEP) of the tested block $B_o$. That is, if there are t updated segments in $B_j$ that correspond to old segments in $B_o$, $$DEP(B_o) = DEP(B_o) - \sum_{i=0}^{t-1} \text{Size}(CS_i) \qquad \text{Equation 2}$$

Wherein:

$B_o$ is a block in the blocks list (not yet in the update list) on which $B_j$ depends;

t is the number of corresponding segments (CS) in $B_j$ that correspond to $B_o$ (t>=1); and $CS_i$ is an updated segment in the new version of $B_j$ that corresponds to an old segment in $B_o$.

After the DEP values have potentially been modified at 611 the next block having the smallest dependency value is selected (606) and the process repeats itself, until the blocks list is found to be empty (then, it is appreciated that k=0).

Upon termination, the update sequence queue represents the determined update sequence. It should be noted that according to one embodiment the update package can be re-arranged to reflect the update sequence. Alternatively it is possible to associate the update sequence, or more accurately, a representation thereof, with the update package. A representation of the update sequence can be, for example, by sorting and storing the update commands in the update package according to their target segments addresses, in accordance with the update sequence.

Figure 7:
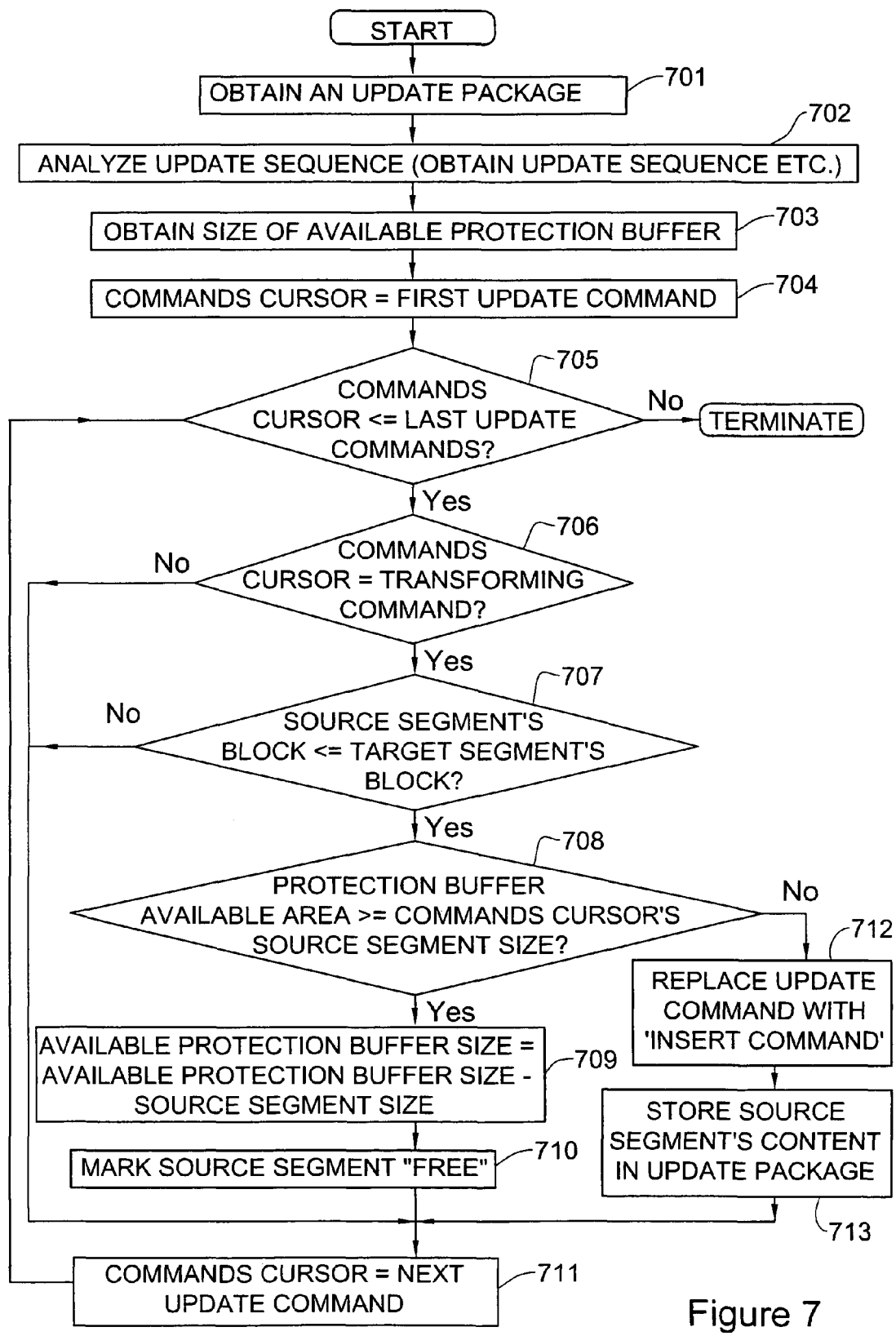
FIG. 7 is a flowchart illustrating generation of an update package, in accordance with one embodiment of the invention.

FIG. 7 is a flowchart illustrating generation of an update package, in accordance with one embodiment of the invention. Before providing detailed explanation of the flowchart, it should be appreciated that when generating an update package, the generator has to predict the updated devices' behavior, including protection buffer usage, thus allowing to improve usage thereof, e.g., by determining the update sequence. Only upon predicting that the protection buffer is fully occupied (or unavailable), copy commands are replaced with insert commands, as done, for example, in U.S. Pat. No. 6,018,747.

In 701 an update package (constituting a first update package) is obtained by any method. It can be generated locally, or received from an external source, e.g., via a communication network, in an inter-process communication, by reading it from any kind of storage device, etc. To this end the update package (constituting a first update package) can be generated by any known method, such as in accordance with U.S. Pat. No. 6,546,552, WO 2004/114130 or WO 2005/003963 or by utilizing a known per se diff tool.

The first update package is analyzed in 702 in order to identify corresponding segments and an update sequence. The update sequence can be determined, for example, in accordance with FIG. 6 described above. It is noted that before determining the update sequence it is possible to analyze the update package in order to identify corresponding segments therein. Alternatively, it is possible to identify corresponding segments when determining the update sequence (see for example, 601 in FIG. 6). In addition, in those cases when the update package is pre-organized in accordance with a preferred update sequence, or when it is associated, e.g., with information laying out a preferred update sequence (such as a list), 702 can be skipped.

In order to generate the update package in accordance with the embodiment it is required to obtain (703) the size of a storage area available to be used as a protection buffer in an updated device, thus generating an update package optimized for this device. This embodiment assumes that all the storage devices that will be updated in accordance with the generated update package have an available storage whose size is substantially equal to the obtained size.

Alternatively, according to another embodiment, it is possible to have a predetermined size for the protection buffer. An update package generated in accordance with this latter embodiment is adapted for updated devices that have free area larger or equal in size to the predetermined size. For example, it is possible to determine the required size of the protection buffer (such as the pre-determined size), e.g. in the update package generator, and store the required size in the update package. When an updated device receives the update package, or when the update process starts operating accordingly, the updated device can try to allocate a protection buffer, in accordance with the required size stored in the update package. If there is not enough free storage area in the device for allocating the protection buffer, it is possible to terminate the operation of the update process, thus avoiding, e.g., memory overflow. It is even further possible to inform the update package server 105 about the situation, possibly including the updated size of the available storage area, thus allowing transmission or re-transmission of an update package better adapted to the updated device. It is noted that such an update package can be pre-prepared by the update-package generator 104 and be pre-stored in the update server as described below. Alternatively, the update server can instruct the update package generator 104 to generate an update package adapted to the available size etc.

Yet other embodiments are also allowed. For example, it is possible to communicate with the updated devices for obtaining their available storage which can be used as protection buffer (unlike receiving the information from the device upon transmitting thereto an update package that is not adapted), and then to generate an update package adapted for the obtained size, and to convey it to the updated device. Combinations of the abovementioned embodiments are also allowed.

Those versed in the art would appreciate that when an updated device receives an update package it stores it in an accessible storage area. Therefore, when considering available storage area in an updated device, it should be taken into account that the update package needs to be stored therein too. Similarly, a certain storage area may be required for the operation of the update process etc.

Returning to FIG. 7, in order to generate an update package in accordance with the embodiment, a cursor is initiated in 704 to be indicative of the first update command in the update sequence. This cursor constitutes a "commands cursor".

Before continuing with describing FIG. 7, it is noted that update commands are generally divided, according to the embodiment, into three main categories. One category includes commands that are founded, or based on original content stored in segments of the original version, or in other words, such commands use original content in order to generate updated content. These commands constitute "founded commands" or "transforming commands". For example, a "copy command" belongs to the category of transforming commands. A transforming command, thus, has a "source segment" (the original segment on whose original content the command is based) and a "target segment" (the updated segment whose updated content is generated by the transforming update command). The second category, of "incorporating commands", includes update commands that incorporate into the updated version updated content that is not based on original content. For example, an "inset command" introduces content into the updated version; this content is not taken from the original version, but more likely from the update package or from any other source. The third category is of "erasing commands". An erasing command erases original content included in a segment of the original version, without yielding a corresponding segment thereof in the updated version. An example of an erasing command is the "delete" update command.

It is noted that copy commands are not the only transforming commands. Any command that has a source segment and a target segment is a transforming command. For example, one such transforming command can transform all lower case characters stored in the source segment to upper case. Another transforming command can multiply a number stored in the source segment by a certain value, etc.

In addition, the content affected by a transforming command constitutes "modified content". When considering the block where the source segment resides (constituting a "source block"), and the block where the target segment resides (constituting a "target block"), it should be appreciated that at least part of the content of the source block is modified in the target block. That is, it is possible that part of the source block is, e.g., deleted, and hence does not form part of the content stored in the updated block.

In accordance with the embodiment illustrated in FIG. 7, for each update command in the update package (see 705), if in 706 it is determined whether the commands cursor is indicative of a transforming command, and if so, it should be checked whether the original content of the source segment requires explicit protection or not.

It was previously demonstrated, with reference to FIGS. 5A and 5B, for example, that when updating content in an updated block, explicit protection of an original segment's content is not required when, in accordance with the update sequence, a transforming command's target segment's block precedes the transforming command's source segment's block. Therefore, in 707 it is checked whether source segment's block precedes the target segment's block, or if the source segment's block is the same as the target segment's block, and if so, the content of the source segment requires protection. Before protecting the content, it is further checked in 708 whether the protection buffer has enough available storage area to store the protected copy of the source segment.

If there is enough space available in the protection buffer, in 709 the available size is reduced by the size of the source segment, and in 710 the source segment is marked as free. It is noted that instead of marking a source segment as free, alternative embodiments can delete the original content of the source segment or perform any other applicable operation, including not performing an operation at all. In 711 the commands cursor is advanced to the next update command in accordance with the update sequence. To this end it is noted that during update package generation there is no need to update the original version to the updated version, and "simulation" thereof is sufficient. Thus, when operating in accordance with the flow chart of FIG. 7, the update package generator (or any other processor generating the update package accordingly) does not have to operate in accordance with the update commands.

Returning to 708, if it is found that there is not enough available space in the protection buffer to store the protected content of the source segment, it is understood that this content must be protected elsewhere before overwriting it with updated content. It was previously noted, with reference to FIGS. 3B and 3C, that the content can be protected, e.g., by storing a copy thereof in the update package itself. Therefore, in 712 the update command indicated by the commands cursor is replaced with an Insert command, and in 713 the original content of the source segment is protected by storing a copy thereof in the update package (see, for example, U.S. Pat. No. 6,018,747).

In the embodiment depicted in FIG. 7, when the available protection buffer size is too small (see 708), content requiring protection is stored in the update package. It should be understood that even though a source segment is too large for protection in the protection buffer, as long as the protection buffer's available size is larger than zero, it is possible that contents of other source segments (being source segments of other transforming update commands further in the update sequence) are small enough for protection therein.

Before turning to describe the update process operating in the updated devices, it should be appreciated that according to some embodiments, the protection buffer can be reused in order to increase its effectivity, as was already noted with reference to FIGS. 5A, 5B and 5C. In other words, when content stored in the protection buffer is not required anymore, some embodiments can free the area used by this not-required content (e.g., by physically deleting the content or by marking it as free etc.) thus allowing the update process to re-use the free area for further backup operations required while updating. Reusing the protection buffer effectively allows performing more protection operations and hence, the update package size can be reduced (less protected content needs to be stored therein). The reuse is simulated during generation of the update package, hence allowing the generator to know when the protection buffer is full and when there is a free space therein.

Figure 8A:
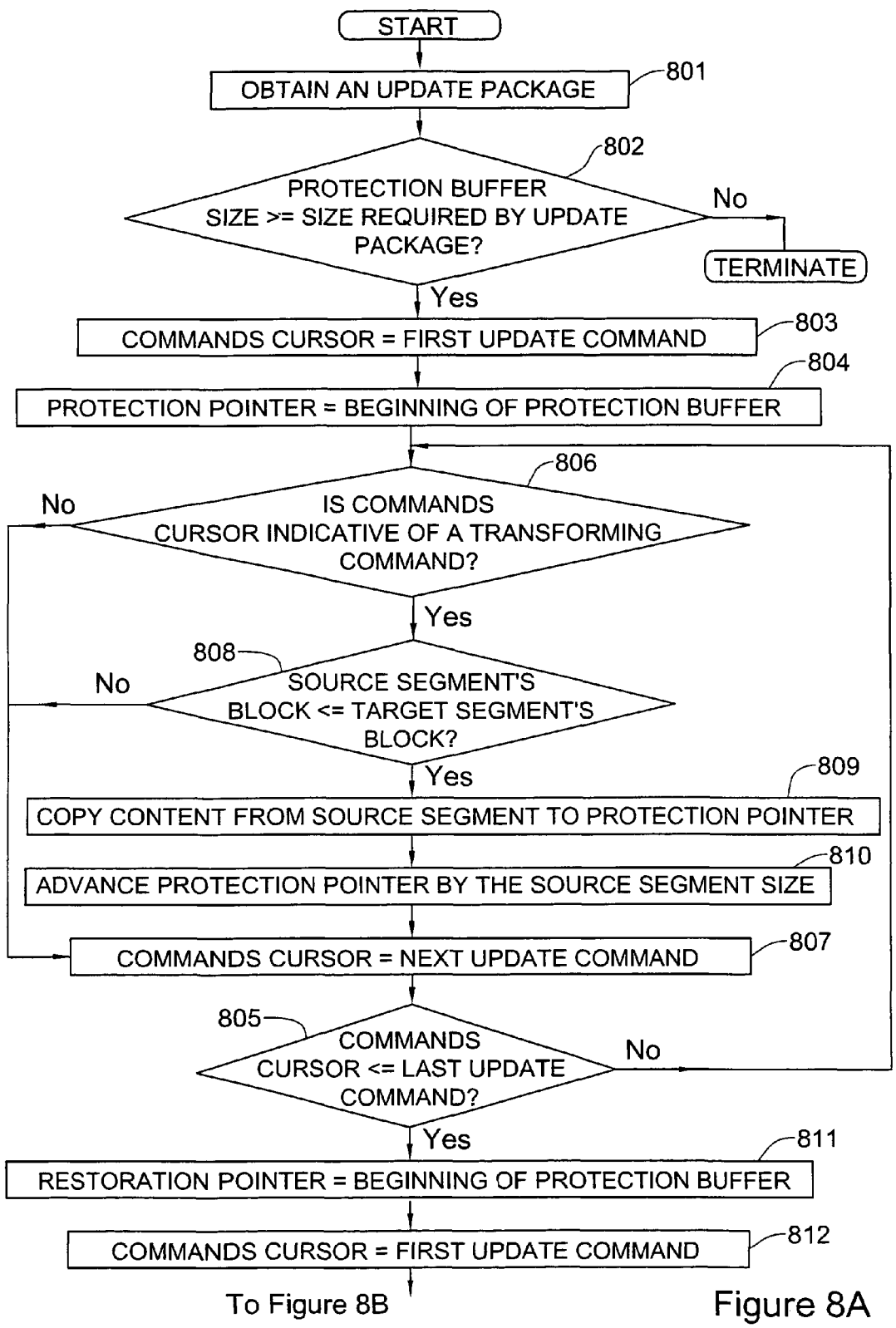
FIG. 8A and FIG. 8B illustrate together a flowchart depicting updating of an original version to an updated version thereof, in accordance with one embodiment of the invention.
Figure 8B:
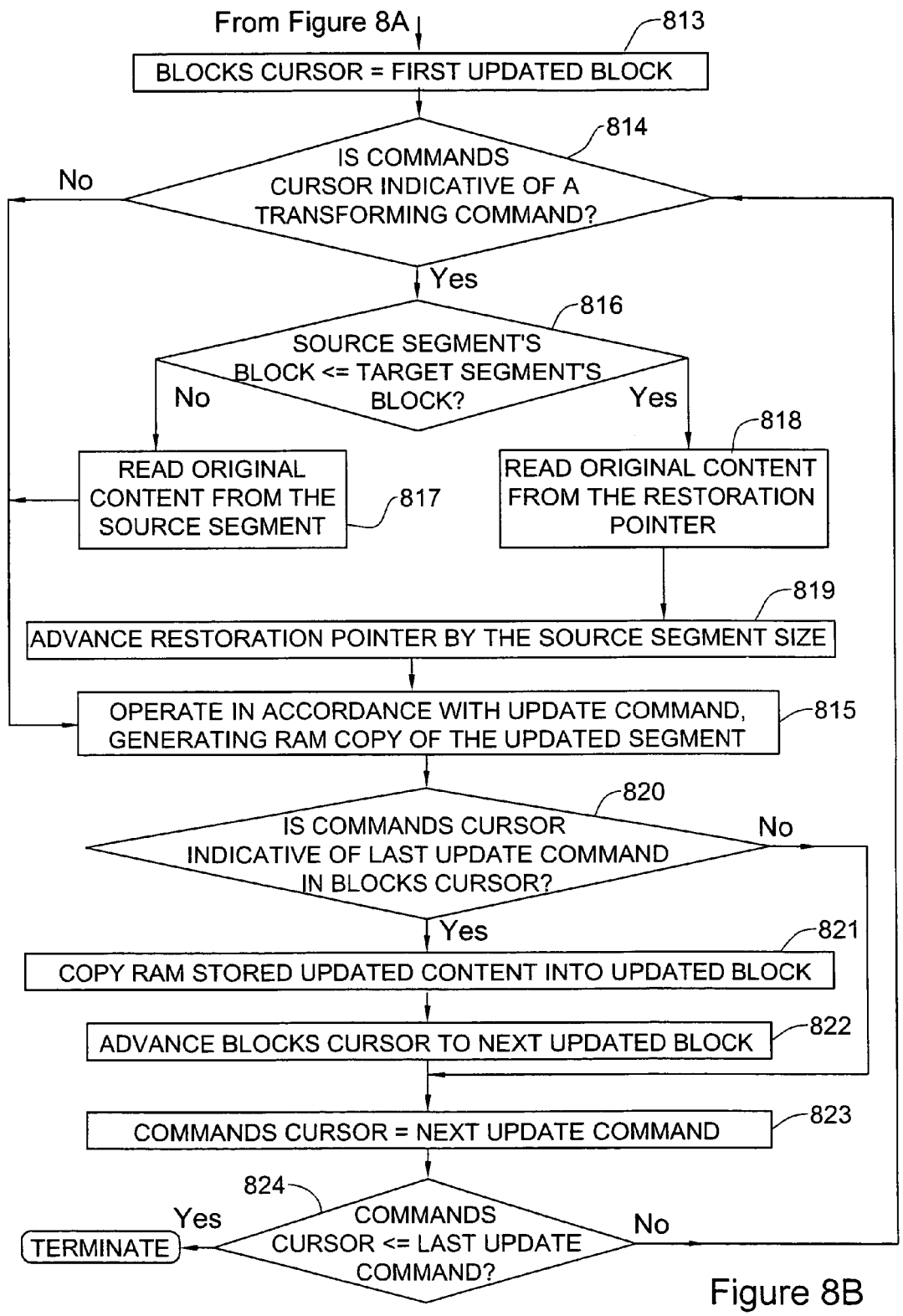

After considering an embodiment for generating an update package, the description turns now to FIG. 8A and FIG. 8B, illustrating together a flowchart depicting updating an original version to an updated version thereof, in accordance with one embodiment of the invention. The flowchart depicted in FIG. 8A and FIG. 8B is applicable, for example, in an update process operable in an updated device. It should be appreciated that the illustrated embodiment is adapted to operate in an updated device having a storage device including blocks.

When an update process starts operating, in 801 it obtains, or accesses an update package stored in the storage device 103, e.g., in volatile or non-volatile memory. It is appreciated that the updated device could have received the update package previously from the update server 105. Alternatively, the update package was loaded to the storage device by any applicable means, such as by copying it from a portable memory device (e.g., a floppy or compact disc) or by receiving it from the Internet. It should be further appreciated that according to the embodiment, the accessed update package has a certain update sequence. The update sequence can be determined simply by the order of the update commands in the update package, or is can be determined in accordance with additional information stored in association with the update package, such as a list determining the sequence for executing update commands, e.g., if different from the sequence in which the commands appear in the package. According to the example, the update sequence is adapted to reduce protection buffer usage in the updated device, or at least improves utilization of the protection buffer available therein. According to one embodiment, the update package could have been generated and the update sequence could have been determined (e.g., in an update package generator) in accordance with the flowcharts of FIGS. 6 and 7.

According to the embodiment, before updating any content (thus risking with overwriting original content requiring protection), the update process checks in 802 that there is enough storage device available in the updated device for running the update process in accordance with the update package obtained in 801. According to the embodiment, if the update package includes an indication of the required protection buffer size, this required protection buffer size is compared in 802 with the protection buffer size available in the updated device, terminating the update process if the available protection buffer size is not enough.

Furthermore, before updating any content the update process protects all the original content requiring protection. Due to the verification performed in 802, it is assured that the available protection buffer is sufficient for storing all the data requiring protection, and therefore a further test such as "available protection buffer size>=segment protected size" is redundant.

In order to allow protection, a pointer or a cursor is initiated in 803 to be indicative of the first update command in accordance with the update sequence. This cursor constitutes a "commands cursor". The commands cursor will be further advanced in accordance with the update sequence.

Furthermore, in 804 a pointer to the protection buffer is initiated, constituting a "protection pointer". The protection pointer is indicative of the position in the protection buffer into which protected data should be written next. It is noted that according to the embodiment the updated device can generate a copy of the protected content, e.g., in RAM (constituting a "RAM protection buffer"), and then, when the RAM copy is complete (i.e., it includes all the content that needs to be protected), write it into the "non-volatile protection buffer" (constituting also a "non-volatile backup buffer") in the non-volatile storage device. Writing the protected content stored in the RAM protection buffer into the non-volatile backup buffer is referred to as "backup block storage operation". As the non-volatile storage device is a storage device including blocks (unlike RAM), this method is more efficient than writing content of every protected segment directly into the non-volatile protection buffer. To this end it is appreciated that in this case the protection pointer is indicative of the position in the RAM protection buffer into which protected data should be written next. It is noted though that hereinafter, unless specifically noted, the description will refer to "protection buffer" without distinguishing between the RAM and the non-volatile protection buffers.

It is noted that "RAM protection buffer" is only one example of a "volatile protection buffer".

For each update command (see 805), the update process checks (in 806) if the commands cursor is indicative of a transforming update command. It should be appreciated that an update command that is not a transforming update command does not require protection, and therefore, in 807 the commands cursor can be advanced to the next update command. However, if in 806 the update process determines that the update command is a transforming command, it further checks in 808 if the block that includes the command's source segment precedes or is the same as the block that includes the target segment. Again, it should be understood that if the block that includes the target segment precedes the block that includes the command's source segment, no protection is required and the update process can advance (in 807) the commands cursor. However, if the block that includes the command's source segment precedes or is the same as the block that includes the target segment, protection is required. Thus, in 809 the update process copies the source segment to the protection buffer, i.e., to the protection pointer, and in 810 it advances the protection pointer by the size of the source segment.

As was noted before, the process described so far, with reference to 806, 807, 808, 809 and 810 repeats (see 805), until the update process protects all the segments requiring protection. After this has been completed, the content requiring protection is protected in the protection buffer. The number of protection operations used to protect the protected content in the protection buffer is referred to as p. It is noted though that if the protection buffer is a RAM protection buffer, its content should be stored in the non-volatile protection buffer before starting to update the original content of the original version, thus overwriting at least portions of the original content, thus providing also reliability to the update process in case the process is aborted and restored. The storage in the non-volatile protection buffer can take place, e.g., further to 805, and before moving to 811.

Further to protecting the content in the protection buffer, the update process can start updating the original content originally stored in the storage device, thus generating the updated version. In order to do so, it should be appreciated that original content previously protected in the protection buffer should be read therefrom, instead of reading it from the original version. In other words, such content should be restored. Therefore, a new pointer, constituting a "restoration pointer" is initialized in 811, initially pointing to the beginning of the protection buffer. In 812 the commands cursor is re-set to be indicative of the first update command in the update package.

It was previously explained that the illustrated embodiment is adapted for storage devices including blocks, hence creating a copy of an updated block in RAM (or generally in a "volatile updated buffer"), and then, writing the whole block to the non-volatile storage device. The operation of writing the content stored in the volatile updated buffer into a block in the non-volatile storage device is referred to as "update block storage operations". Therefore, an additional cursor, constituting "blocks cursor" is initialized in 813, to be indicative of the first updated block in accordance with the update sequence.

Hereinafter, the number of update block storage operations and backup block storage operation is referred to as m. Yet this is non-limiting and m represents the total number of block storage operations, which includes every operation storing content in a block in the non-volatile storage device.

If in 814 it is determined that the commands cursor is indicative of an update command that is not a transforming update command, it is appreciated that this update command is not based on content originally being part of the original version, that is, it is not based on content stored in either the original version or the protection buffer, and therefore in 815 the update process can operate in accordance with the command, thus generating a copy of the target segment in RAM.

Returning to 814, if the update process determines that the commands cursor is indicative of a transforming command, it further checks, in 816, whether the block that includes the command's source segment precedes or is equal to the block that includes the target segment. Remembering that no protection is required for a source segment included in blocks that follows the target segment's block in accordance with the update sequence, it is appreciated that the update process did not protect the source segment of this update command in 808 and 809, leaving the original content stored in the original segment instead of copying it into the protection buffer. Therefore in 817 the update process reads the source content from the update command's source segment, and in 815 the update process operate in accordance with the update command, thus generating a copy of the target segment in RAM.

However, if in 816 the update process determined that the source segment's block precedes or is the same as the target segment's block, it should read the original content (or a copy thereof) from the protection buffer. Therefore, in 818 the update process reads the source content from the address indicated by the restoration pointer, in 819 the restoration pointer is advanced by the size of the source segment, thus pointing to the next protected segment, and in 815 the update process operates in accordance with the update command, thus generating a copy of the target segment in RAM.

One way or the other, following 815 (the execution of the update command, generating the target content in RAM) it is appreciated that the update process can copy and write the content stored in RAM into the updated block if in 815 it wrote the content of updated block's last target segment into RAM. Therefore, in 820 the update process checks whether the commands cursor is indicative of the last update command in the block indicated by the blocks cursor, and if so, the content of the updated block, currently stored in RAM, is copied and written in 821 into the updated block in the storage device, and in 822 the blocks cursor is advanced to the next updated block.

It is noted though that if in 820 the update process determined that the update command is not last in the updated block (as indicated by, the blocks cursor), the commands cursor is advanced (see 823) without copying the RAM stored content and without advancing the blocks cursor. It is further noted that by advancing the commands cursor (in 823) beyond the last command in the updated block, it becomes indicative of the first update command in the next updated block. And thus, if the advanced commands cursor precedes the last update command in accordance with the update sequence, or is equal to (see 824), the update process can operate in accordance with this update command, thus generating updated content (see 814, 815, 816 etc.). Alternatively, if in 824 the update process determines that it moved past the last update command it can terminate, as the updated version is stored in the storage device.

It should be appreciated, further to the flowchart of FIG. 8A and FIG. 8B and further to the example of FIGS. 5A, 5B and 5C that the size of the protected content (just before storing it in the non-volatile protection buffer) includes less blocks than the number of n (n>1) blocks of the original version that are modified in the updated version. That is, less than n operations are required in order to store protected content in the non-volatile protection buffer. If the number of block storage operations is designated m, it should be appreciated that $2 <= m < 2n$.

It is further noted that reusing the protection buffer could be beneficial. The reuse which was simulated during generation of the update package (with reference to FIG. 7) reflects the behavior of the update process described in FIG. 8A and FIG. 8B. Hence, if reuse is utilized, it is possible to check further to 821 if the updated content just stored used protected content and if so as long as the protected content is not required for additional segments (in the same block or in other blocks following in accordance with the update sequence), this protected content can be marked as free. When all the protected content stored in one block of the non-volatile protection buffer is marked as free, this protected content can be deleted and the block can be reused.

Following the methods described for generating update packages and for updating original versions of content thus generating updated versions thereof, apparatuses that are able to perform these methods will be further described.

Figure 9:
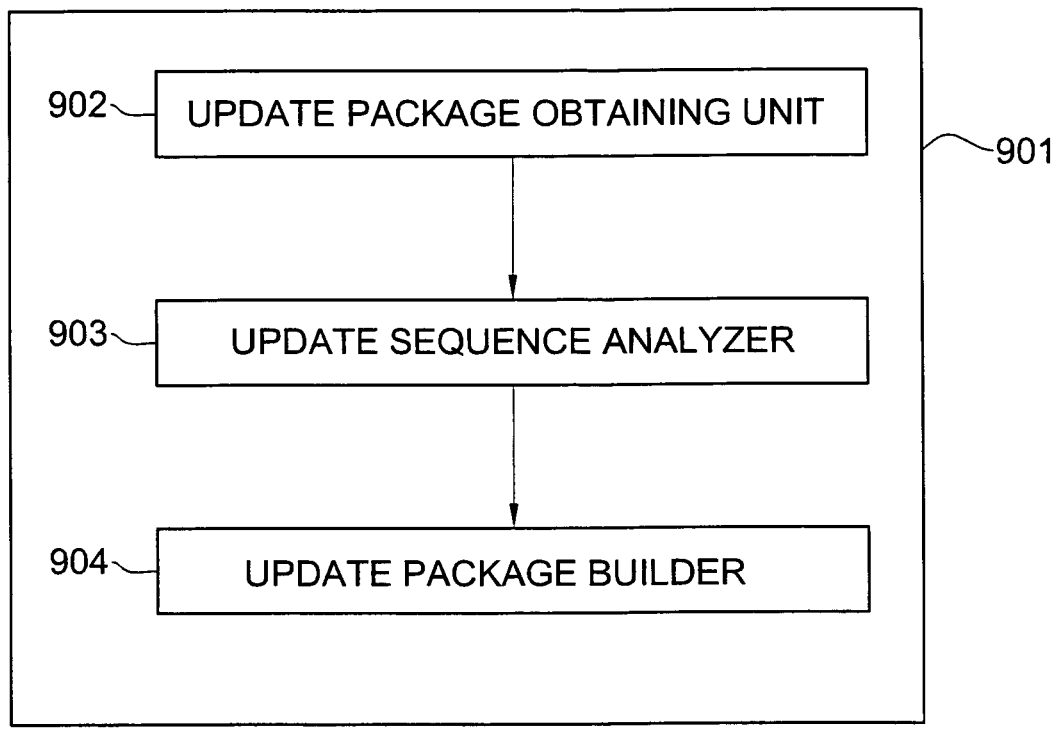
FIG. 9 illustrates an apparatus for generating an update package, in accordance with one embodiment of the invention.

FIG. 9 illustrates an apparatus 901 for generating an update package in accordance with one embodiment of the invention, such as the update package generator 104. According to the embodiment the update package generator 104, includes an update package obtaining unit 902. The update package obtained by the update package access unit 902 can be any update package, including a simple delta generated by applying a known per se diff tool, or any other update package, generated in accordance with any method applicable to the case. In addition, it should be appreciated (as was previously noted with reference to 701 in FIG. 7, for example) that the update package obtaining unit can obtain a pre-prepared update package or generate an update package in accordance with any method known in the art.

An update sequence analyzer 903 is coupled to the update package access unit 902. The update sequence analyzer 903 receives an update package from the update package access unit 902 and determines an update sequence that improves protection buffer usage. The update sequence can be determined, for example, in accordance with the method illustrated in FIG. 6.

An update package builder 904, coupled to the update sequence analyzer 903 builds a new update package, in accordance with the update package received from the update package obtaining unit 902 and the update sequence determined in the update sequence analyzer 903. FIG. 7 illustrates an embodiment of a method that can be applied in the update package builder 904.

It is noted that according to certain embodiments the invention includes an apparatus 901 for generating an update package, wherein the update package is configured to optimize an update sequence. The optimization, according to certain embodiments will achieve a protected content size which is smallest than any other protected content size achieved by any other update sequence. According to other embodiments the protected content size is smaller than the average protected content size achieved by all possible update sequences. According to yet other embodiments, the protected content size is smaller than an arbitrary size of a protected content that depends on an arbitrary update sequence associated with the update package. In addition, other variants are also applicable.

Figure 10:
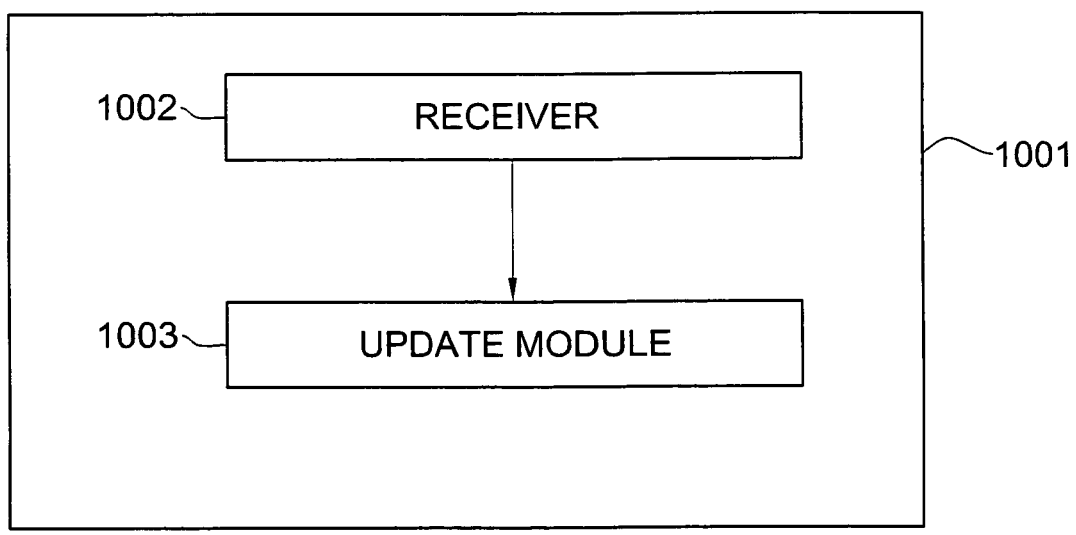
FIG. 10 illustrates an apparatus for updating an original version of content to an updated version thereof, in accordance with another embodiment of the invention.

FIG. 10 illustrates an apparatus 1001 for updating an original version of content to an updated version thereof, in accordance with another embodiment of the invention. The apparatus 1001 includes a receiver 1002 that obtains an update package. As was previously explained, e.g. with reference to 801 in FIG. 8A and FIG. 8B, the update package can be obtained by receiving it from a communication network or it can be obtained by any alternative method. The apparatus 1001 further includes an update module 1003 such as an update process that is adapted to update the original version currently stored in the updated device's storage device thus generating an updated version. The update module 1003 can operate, for example, in accordance with the flowchart illustrated in FIG. 8.

It is noted that the embodiments described above referred to the option of copying original (protected) content into the protection buffer. Yet, this is non-limiting and it should be appreciated the instead of simply copy, it is possible to compress the protected content into the protection buffer, encrypt it and perform any other manipulation thereon.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In addition, those versed in the art would appreciate that a system according to the invention can be hardware. Alternatively, the system can compose hardware and software components.

The invention claimed is:

1. A method for reliably in-place updating an original version of content in a non-volatile storage device, comprising:
    obtaining an update package having a sequence of instructions to update n (n>1) blocks of original content to updated content according to an update sequence of said n blocks;
    updating said n blocks of original content in accordance with the update package;
    performing, while updating said n blocks of original content, m instances of storing a block size of content to the non-volatile memory, including storing at least one first block size of content to a non-volatile protection buffer, wherein the original content is divided into segments, and content of one or more segments of the original content that is not required further in the update sequence is not stored in said non-volatile protection buffer, resulting in m instances of copying a block size being (i) greater than one and (ii) less than 2n blocks (1<m<2n).

2. The method of claim 1, comprising protecting original content in a volatile protection buffer.

3. The method of claim 1, wherein the updated content is generated in a volatile updated buffer.

4. The method of claim 1, wherein one block of the non-volatile protection buffer is used for protecting content originated from more than one block of the n blocks to be updated.

5. The method of claim 4, wherein the more than one block have a combined size greater than one block of the non-volatile protection buffer.

6. The method of claim 4, wherein the size of the content in said non-volatile protection buffer depends on the update sequence and the size is smaller than an arbitrary size of the protected content.

7. The method of claim 4, wherein the size of the protected content in the non-volatile protection buffer depends on the update sequence; and the size is a smallest size among sizes of protected content that depend on any update sequence of all possible update sequences which can be associated with the update package.

8. The method of claim 4, wherein the size of the protected content in the non-volatile protection buffer depends on the update sequence; and the size is smaller than an average size of protected content that depend on any update sequence of all possible update sequences which can be associated with the update package.

9. A non-transitory tangible computer-readable medium comprising computer program code for causing a computer to perform the method of claim 1.

10. An apparatus for reliably in-place updating an original version of content, comprising:
    a non-volatile storage device for storing the original version of content;

an obtain module for obtaining an update package having instructions to update n (n>1) blocks of original content of said original version of content stored in said non-volatile storage device according to an update sequence of said n blocks;

an update module coupled to said obtain module for updating said n blocks of original content in accordance with the update package while performing m instances of storing a block size of content to the non-volatile storage device, including storing at least one first block size of content to a non-volatile protection buffer, wherein the original content is divided into segments, and content of one or more segments of the original content that is not required further in the update sequence is not stored in the non-volatile protection buffer, resulting in m instances of copying a block size being (i) greater than one and (ii) less than 2n blocks (1<m<2n).

11. The method of claim 2, wherein said protecting original content includes storing protected original content stored in the volatile protection buffer in the non-volatile protection buffer.

\* \* \* \* \*